United States Patent
Sohn et al.

(10) Patent No.: US 10,815,343 B2
(45) Date of Patent: Oct. 27, 2020

(54) COMPOSITION FOR PREPARING POLYIMIDE OR POLY(IMIDE-AMIDE) COPOLYMER, POLYIMIDE OR POLY(IMIDE-AMIDE) COPOLYMER, ARTICLE INCLUDING POLYIMIDE OR POLY(IMIDE-AMIDE) COPOLYMER, AND DISPLAY DEVICE INCLUDING THE ARTICLE

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Byunghee Sohn, Yongin-si (KR); Sungwon Choi, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 43 days.

(21) Appl. No.: 16/016,734

(22) Filed: Jun. 25, 2018

(65) Prior Publication Data
US 2018/0371184 A1 Dec. 27, 2018

(30) Foreign Application Priority Data
Jun. 23, 2017 (KR) .......................... 10-2017-0079607

(51) Int. Cl.
*C08J 3/24* (2006.01)
*C08G 73/10* (2006.01)
*C08J 5/18* (2006.01)
*C08G 73/14* (2006.01)
*C09D 179/08* (2006.01)

(52) U.S. Cl.
CPC .............. *C08J 3/243* (2013.01); *C08G 73/10* (2013.01); *C08G 73/101* (2013.01); *C08G 73/1039* (2013.01); *C08G 73/1042* (2013.01); *C08G 73/1067* (2013.01); *C08G 73/14* (2013.01); *C08J 5/18* (2013.01); *C08J 2379/08* (2013.01); *C09D 179/08* (2013.01)

(58) Field of Classification Search
CPC ....................................................... C08J 3/243
USPC .................................. 525/331.1, 330.9, 433
See application file for complete search history.

(56) References Cited

U.S. PATENT DOCUMENTS

| 3,282,898 A | 11/1966 | Angelo |
| 6,090,525 A | 7/2000 | Yuba et al. |
| 6,531,568 B1 | 3/2003 | Shibuya et al. |
| 6,610,815 B1 | 8/2003 | Hata et al. |
| 2017/0194645 A1 | 7/2017 | Nakayama et al. |

FOREIGN PATENT DOCUMENTS

| CN | 103145986 B | 4/2016 |
| EP | 3318592 A1 | 5/2018 |
| JP | 1999-030862 A | 2/1999 |
| JP | 2000-344888 A | 12/2000 |
| JP | 3526829 B2 | 2/2004 |
| JP | 2004-174796 A | 6/2004 |
| JP | 2012-214670 A | 11/2012 |

(Continued)

*Primary Examiner* — Duc Truong
(74) *Attorney, Agent, or Firm* — Cantor Colburn LLP

(57) ABSTRACT

A composition for preparing at least one of a polyimide and a poly(imide -amide) copolymer, the composition including at least one of a polyamic acid and a poly(amic acid-amide) copolymer, and at least one of a carbodiimide derivative and a carbodiimidazole derivative.

20 Claims, 2 Drawing Sheets

(56) References Cited

FOREIGN PATENT DOCUMENTS

Figure 1:
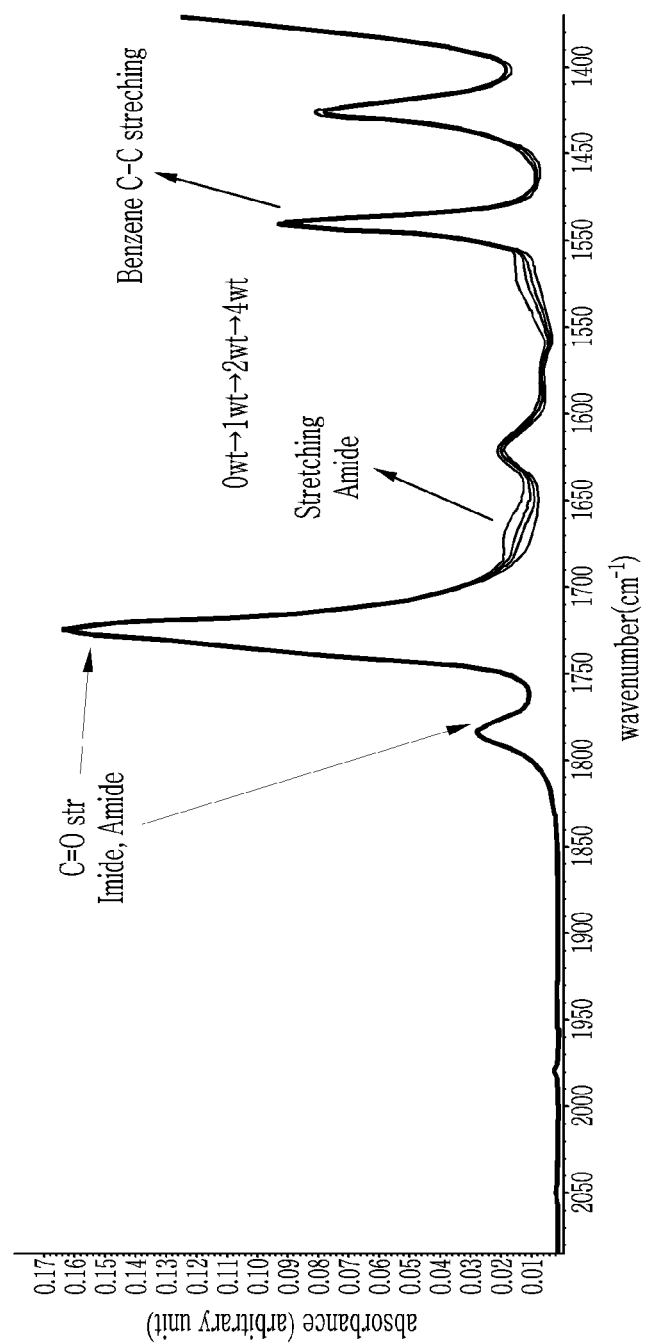

| | | |
|---|---|---|
| JP | 2017-012987 A | 1/2017 |
| KR | 2008-0070924 A | 8/2008 |
| KR | 2016-0113754 A | 10/2016 |
| KR | 2017-0003272 A | 1/2017 |
| KR | 2017-0016830 A | 2/2017 |
| WO | 2008-093971 A1 | 8/2008 |
| WO | 2012-177133 A1 | 12/2012 |

COMPOSITION FOR PREPARING POLYIMIDE OR POLY(IMIDE-AMIDE) COPOLYMER, POLYIMIDE OR POLY(IMIDE-AMIDE) COPOLYMER, ARTICLE INCLUDING POLYIMIDE OR POLY(IMIDE-AMIDE) COPOLYMER, AND DISPLAY DEVICE INCLUDING THE ARTICLE

CROSS-REFERENCE TO RELATED APPLICATIONS

This application claims priority to Korean Patent Application No. 10-2017-0079607 filed in the Korean Intellectual Property Office on Jun. 23, 2017, and all the benefits accruing therefrom under 35 U.S.C. § 119, the content of which is incorporated herein in its entirety by reference.

BACKGROUND

1. Field

This disclosure relates to a composition for preparing a polyimide or poly(amide-imide) copolymer, a polyimide or poly(amide-imide) copolymer, an article including a polyimide or poly(amide-imide) copolymer, and to a display device including the article.

2. Description of the Related Art

Portable display devices such as a smart phone or a tablet personal computer (PC) have been objects of active research because of their high performance and popularity. For example, research and development efforts to commercialize a light-weight flexible (i.e., bendable or foldable) portable display device have been undertaken. The portable display device of a liquid crystal display or the like includes a protective window for protecting a display module such as a liquid crystal layer. Currently, most portable display devices include a window including a rigid glass substrate. However, glass is a fragile material, which gets easily broken by an exterior impact when used in a portable display device or the like. Also, glass is a non-flexible material, so it may not be suitable for a flexible display device. Therefore, extensive efforts have been undertaken to substitute a protective window with a plastic film in a display device. However, it is very difficult for a plastic film to simultaneously satisfy optimal mechanical properties, such as hardness, and optimal optical properties, which are required for the protective window in a display device. Accordingly, the development of the plastic film material as a protective window for a display device has been delayed.

There still remains a need for polymers having excellent optical and mechanical properties that could be used in transparent plastic films.

SUMMARY

An embodiment provides a composition for preparing a polyimide or poly(amide-imide) copolymer having improved mechanical properties, while maintaining good optical properties.

Another embodiment provides a polyamic acid or poly(amic acid-amide) copolymer including a crosslinking through an amide bond between polymer chains.

Still another embodiment provides a polyimide or poly(imide-amide) copolymer including a crosslinking through an amide bond between polymer chains prepared from the composition or the polyamic acid or poly(amic acid -amide) copolymer.

Far still another embodiment provides an article including a polyimide or poly(imide-amide) copolymer.

Yet another embodiment provides a display device including the article.

An embodiment provides a composition for preparing at least one of a polyimide or a poly(imide-amide) copolymer, the composition including at least one of a polyamic acid and a poly(amic acid-amide) copolymer, and at least one of a carbodiimide derivative and a carbodiimidazole derivative.

The carbodiimide derivative includes N,N'-dicyclohexyl carbodiimide, N,N'-diisopropyl carbodiimide, or a combination thereof, and the cabodiimidazole derivative includes a carbodiimidazole.

An amount of the at least one of the carbodiimide derivative and a carbodiimidazole derivative is less than or equal to about 20 percent by weight based on the total weight of the at least one of the polyimide and the poly(imide -amide) copolymer.

An amount of the at least one of the carbodiimide derivative and a carbodiimidazole derivative ranges from about 0.1 percent by weight to about 15 percent by weight based on the total weight of the at least one of the polyimide and the poly(imide-amide) copolymer.

The polyamic acid may include a structural unit represented by Chemical Formula 1, and poly(amic acid-amide) copolymer may include a structural unit represented by Chemical Formula 1 and a structural unit represented by Chemical Formula 3:

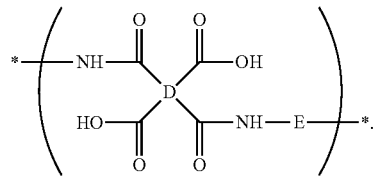

Chemical Formula 1

In Chemical Formula 1,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, and

* is a linking point to an adjacent atom;

Chemical Formula 3

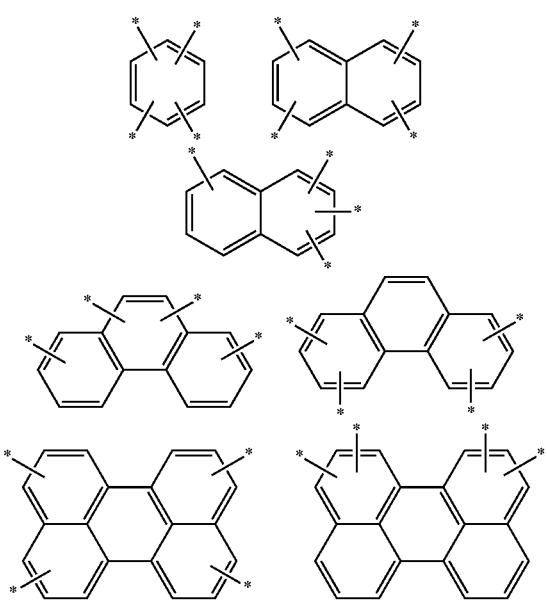

In Chemical Formula 3,

A and B are each independently a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, and

* is a linking point to an adjacent atom.

D in Chemical Formula 1 may be selected from chemical formulae of Group 1:

Group 1

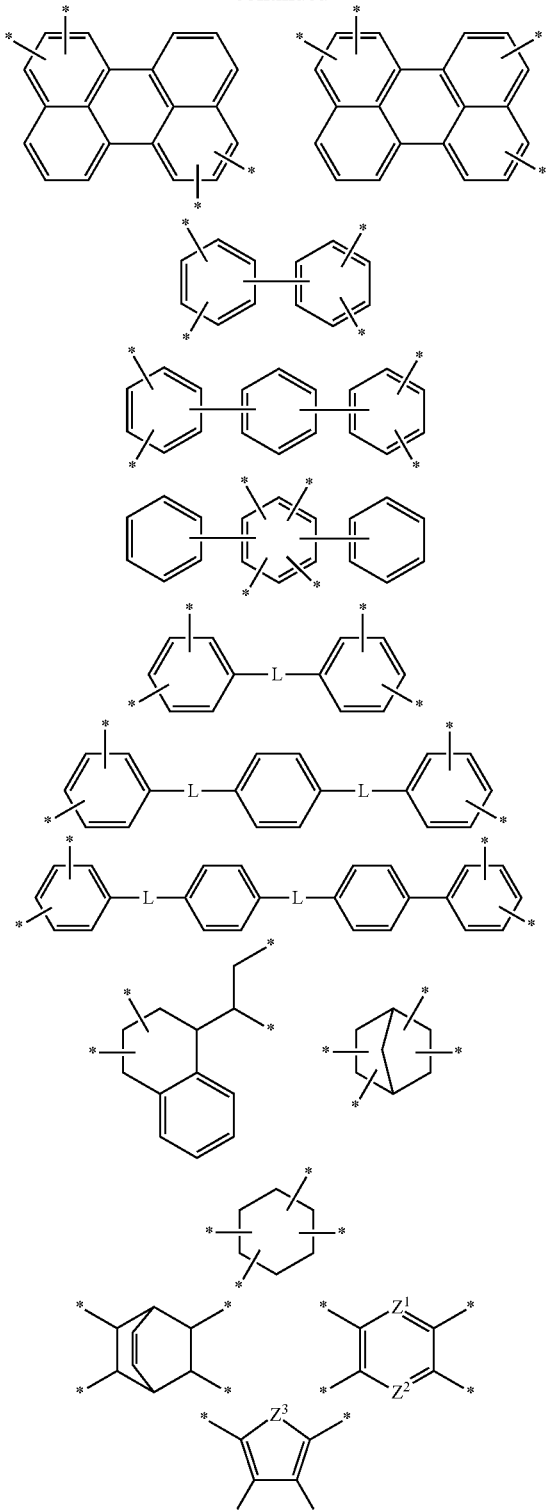

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—

$(CH_2)_q$—, —$(CH_2)_p$—C$(C_nF_{2n+1})_2$—$(CH_2)_q$— (wherein, $1 \leq n \leq 10$, $1 \leq p \leq 10$, and $1 \leq q \leq 10$), —C(CF$_3$)(C$_6$H$_5$)—, or —C(=O)NH—, and \* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

D in Chemical Formula 1 may be selected from chemical formulae of Group 2:

Group 2

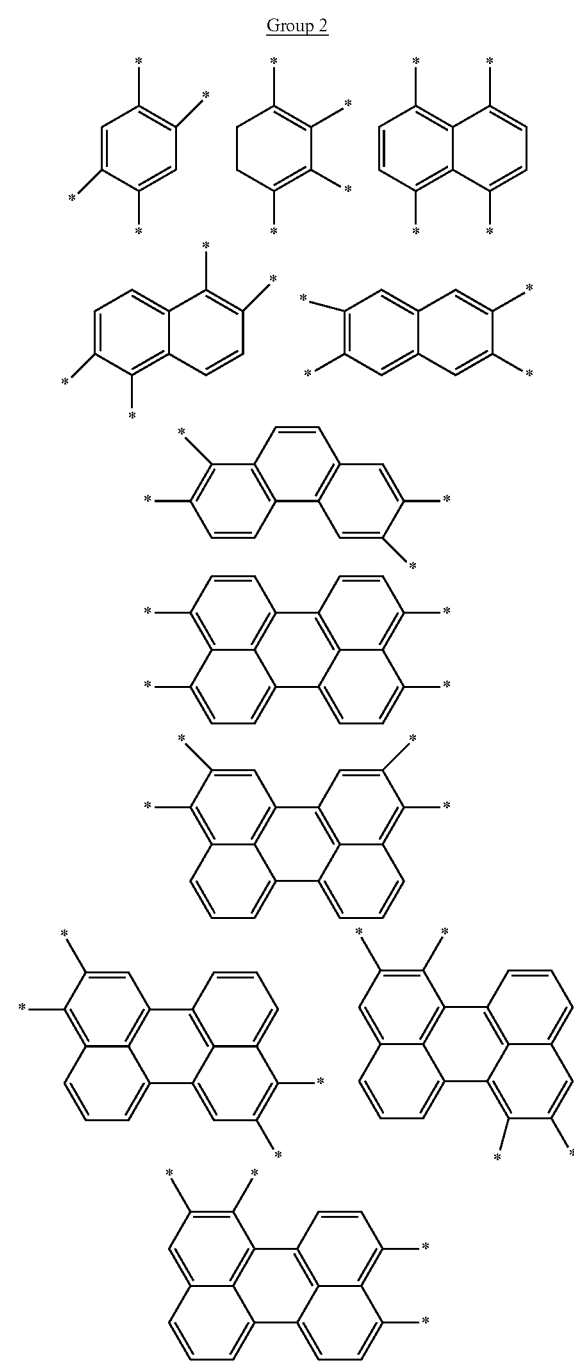

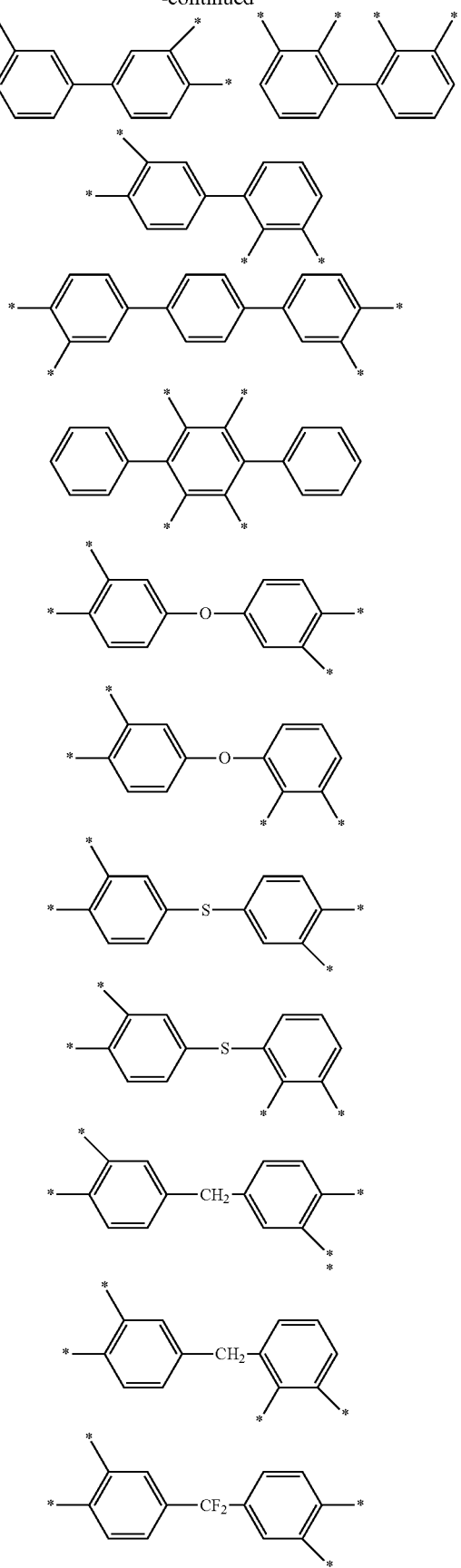

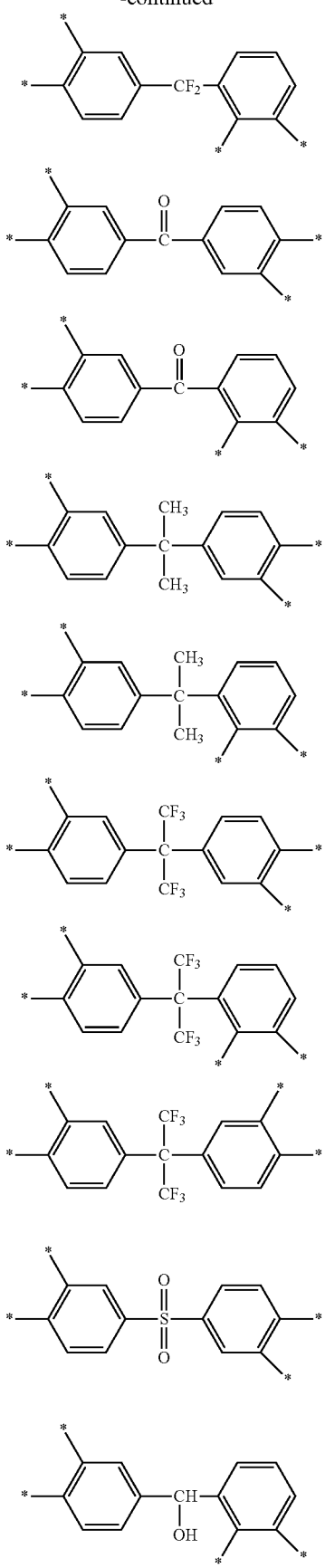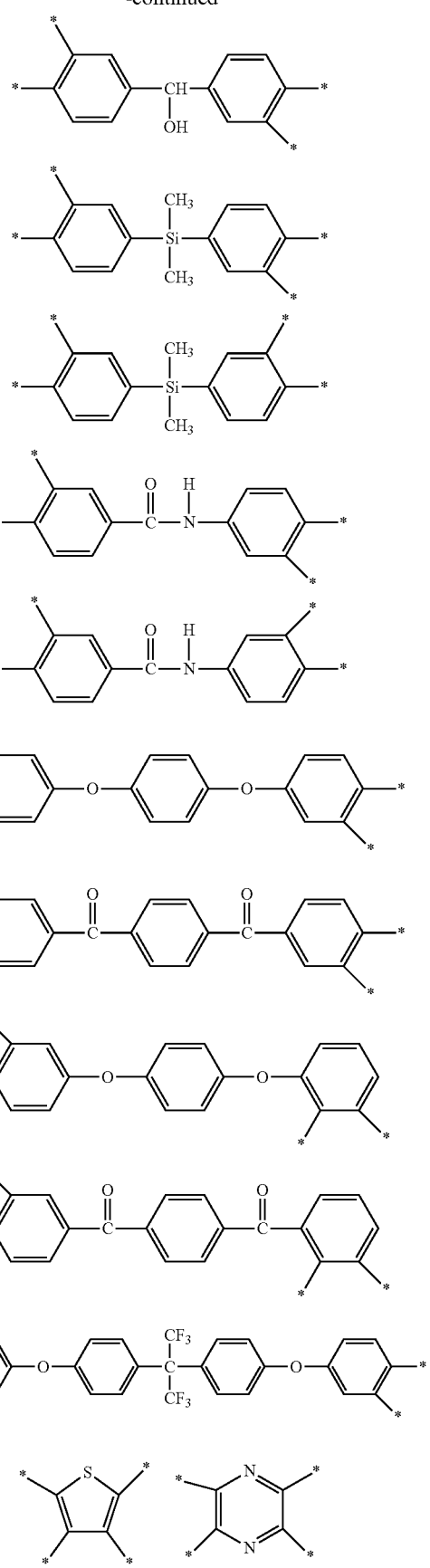

-continued

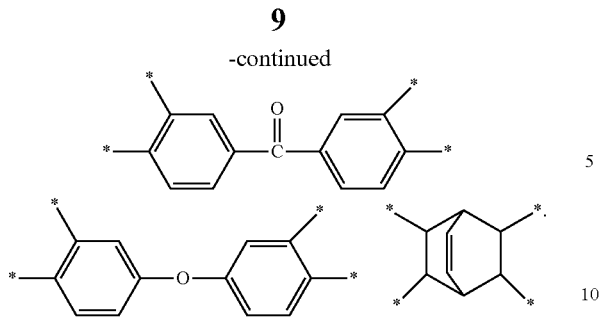

In the chemical formulae of Group 2,
each residual group may be substituted or unsubstituted, and
* is a linking point to an adjacent atom.

E in Chemical Formula 1 and B in Chemical Formula 3 may independently be represented by Chemical Formula 5:

Chemical Formula 5

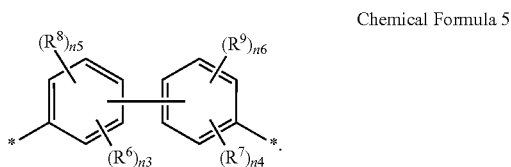

In Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom.

A in Chemical Formula 3 may be selected from chemical formulae of Group 3:

Group 3

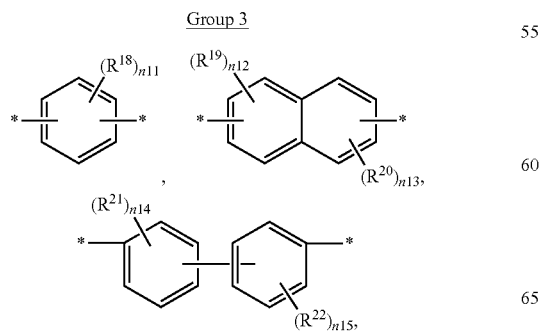

-continued

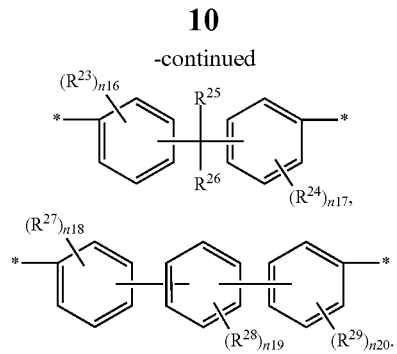

In the chemical formulae of Group 3,
$R^{18}$ to $R^{29}$ are the same or different and are independently deuterium, a halogen, a substituted or unsubstituted C1 to C10 aliphatic organic group, or a substituted or unsubstituted C6 to C20 aromatic organic group,
n11 and n14 to n20 are independently an integer ranging from 0 to 4,
n12 and n13 are independently an integer ranging from 0 to 3, and
* is a linking point to an adjacent atom.

A in Chemical Formula 3 may be selected from chemical formulae of Group 4:

Group 4

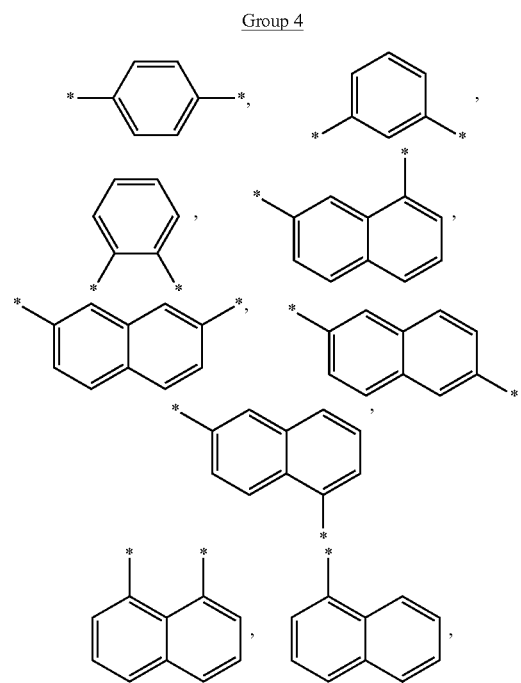

In the chemical formulae of Group 4,
each residual group may be substituted or unsubstituted, and
* may be a linking point to an adjacent atom.

Another embodiment provides a polyamic acid or poly(amic acid-amide) copolymer including a crosslinking through an amide bond between the polyamic acid or poly(amic acid-amide) copolymer chains.

The polyamic acid includes a structural unit represented by Chemical Formula 1, and the poly(amic acid-amide) copolymer includes a structural unit represented by Chemical Formula 1 and a structural unit represented by Chemical Formula 3, and the crosslinking through an amide bond between polymer chains is formed by a carboxylic acid group included in the structural unit represented by Chemical Formula 1, which is included in at least one of the polyamic acid and the poly(amic acid-amide) copolymer, and a terminal amino group in at least one of the other polyamic acid and the poly(amic acid-amide) copolymer:

Chemical Formula 1

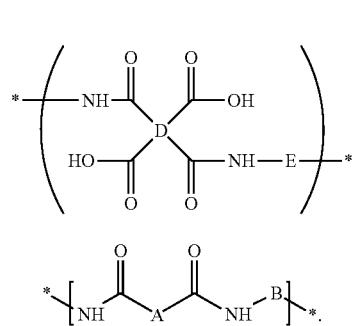

Chemical Formula 3

D and E in Chemical Formula 1, and A and B in Chemical Formula 3 are the same as defined in the above.

The polyamic acid or poly(amic acid-amide) copolymer that includes a crosslinking through an amide bond between the polyamic acid or poly(amic acid-amide) copolymer chains is represented by Chemical Formula 6:

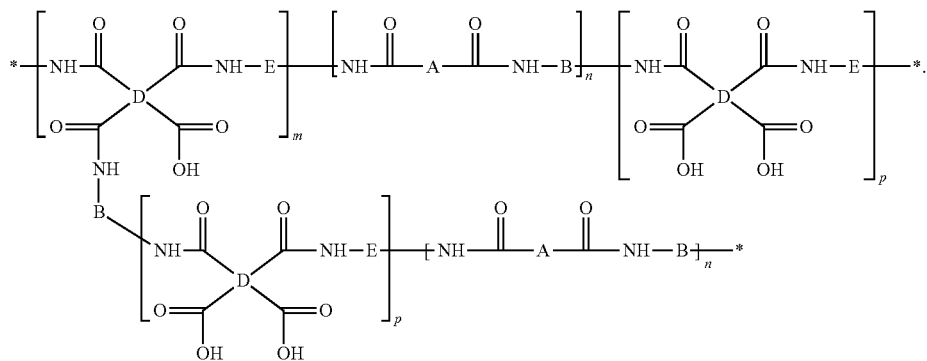

In Chemical Formula 6,
D and E are the same as in Chemical Formula 1,
A and B are the same as in Chemical Formula 3,
m and p are independently an integer ranging from 1,
n is an integer ranging from 0, and
* is a linking point to an adjacent atom.

In Chemical Formula 6, D may be selected from Group 1, E and B may be independently selected from Chemical Formula 5, and A may be selected from Group 3:

Group 1

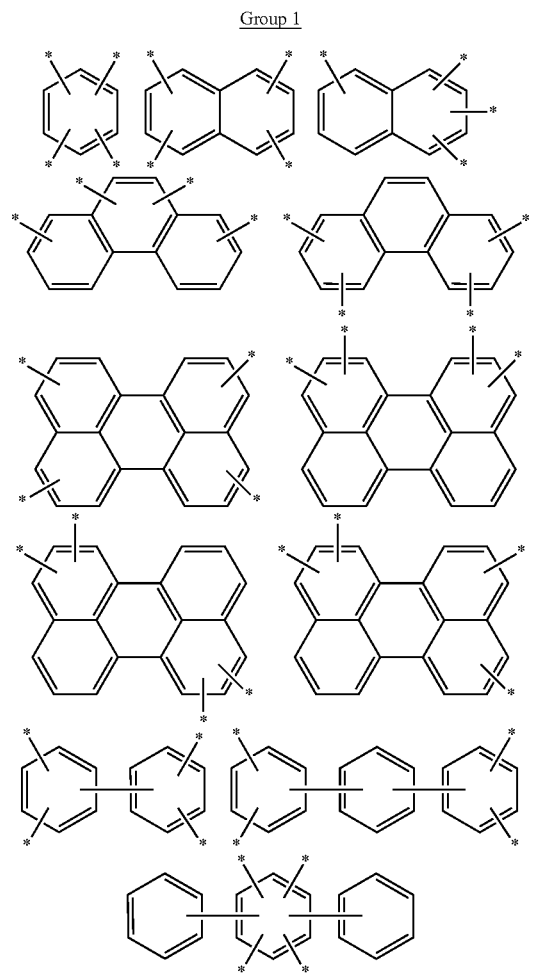

-continued

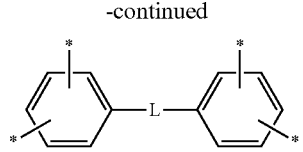

-continued

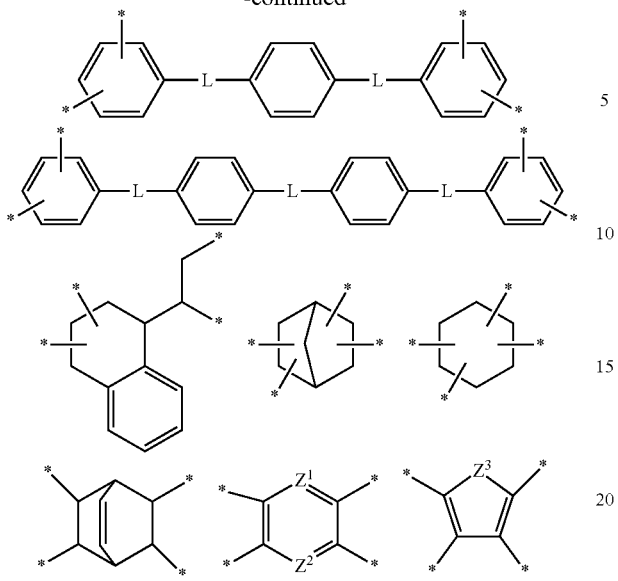

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group;

Chemical Formula 5

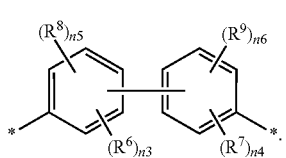

In Chemical Formula 5, $R^6$ and $R^7$ are the same or different and are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$, $R^8$ and $R^9$ are the same or different and are independently a halogen, a hydroxy group, an alkoxy group (—OR$^{204}$, wherein R$^{204}$ is a C1 to C10 aliphatic organic group), a silyl group (—SiR$^{205}$R$^{206}$R$^{207}$, wherein R$^{205}$, R$^{206}$, and R$^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom;

Group 3

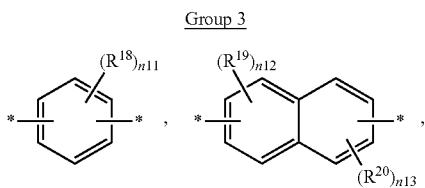

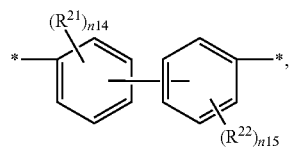

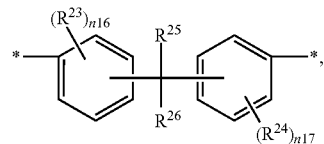

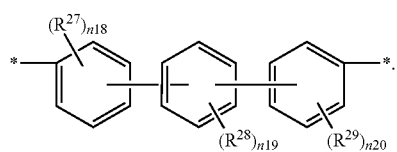

In the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and

* is a linking point to an adjacent atom.

Still another embodiment provides a polyimide or poly(imide-amide) copolymer including a crosslinking through an amide bond between the polyimide or poly(imide-amide) copolymer chains prepared from the composition or from the polyamic acid or poly(amic acid-amide) copolymer according to an embodiment.

The polyimide or poly(imide-amide) copolymer including a crosslinking through an amide bond between the polyimide or poly(imide-amide) copolymer chains may be represented by Chemical Formula 7:

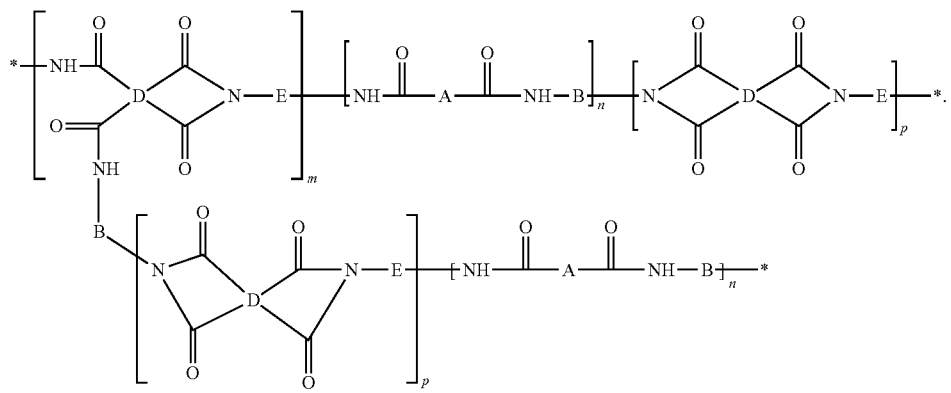

Chemical Formula 7

In Chemical Formula 7,
D and E are the same as in Chemical Formula 1,
A and B are the same as in Chemical Formula 3,
m and p are independently an integer ranging from 1,
n is an integer ranging from 0, and
* is a linking point to an adjacent atom.
In Chemical Formula 7, D may be selected from Group 1, E and B may be independently selected from Chemical Formula 5, and A may be selected from Group 3:

Group 1

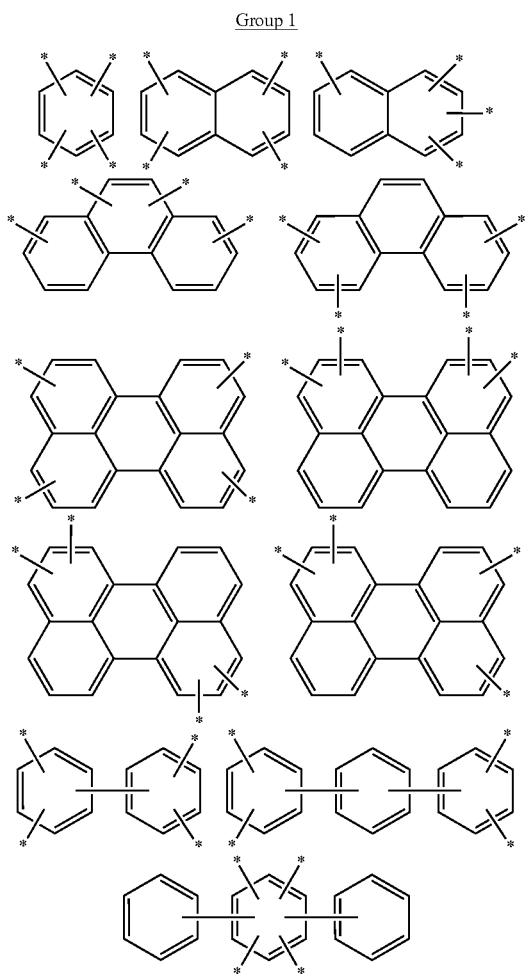

-continued

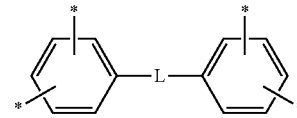

wherein, in the chemical formulae of Group 1,
each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group;

Chemical Formula 5

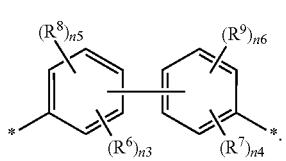

Group 2

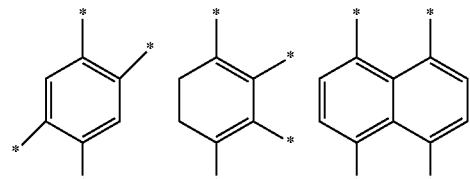
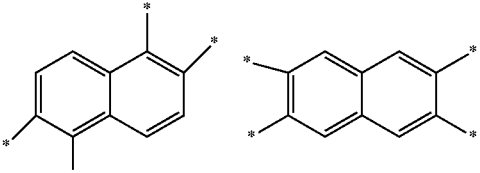
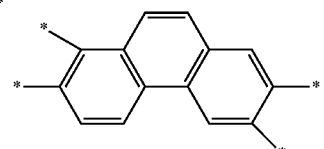
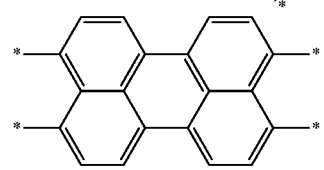
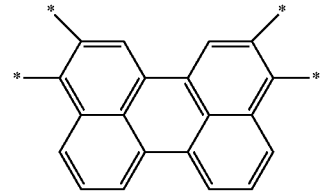
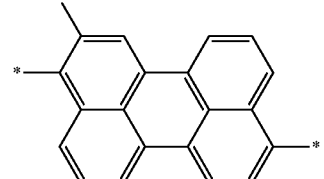
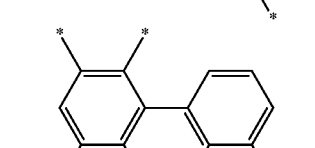
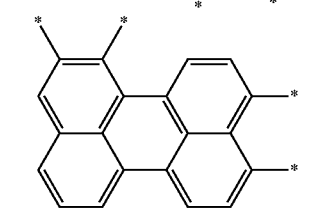
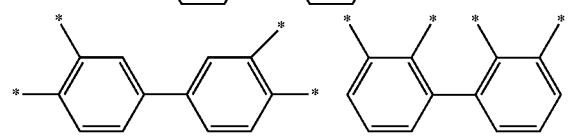

In Chemical Formula 5, $R^6$ and $R^7$ are the same or different and are independently an electron withdrawing group selected from —$CF_3$, —$CCl_3$, —$CBr_3$, —$CI_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom;

Group 3

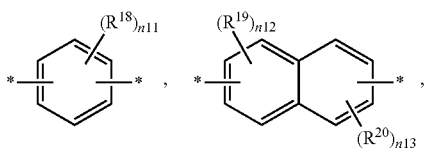
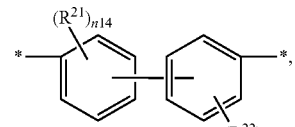
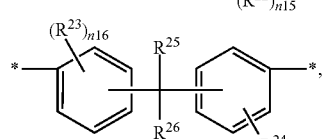
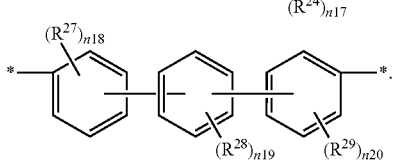

In the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and

* is a linking point to an adjacent atom.

In Chemical Formula 7, D may be selected from Group 2, E and B may be independently selected from Chemical Formula 5, and A may be selected from Group 4:

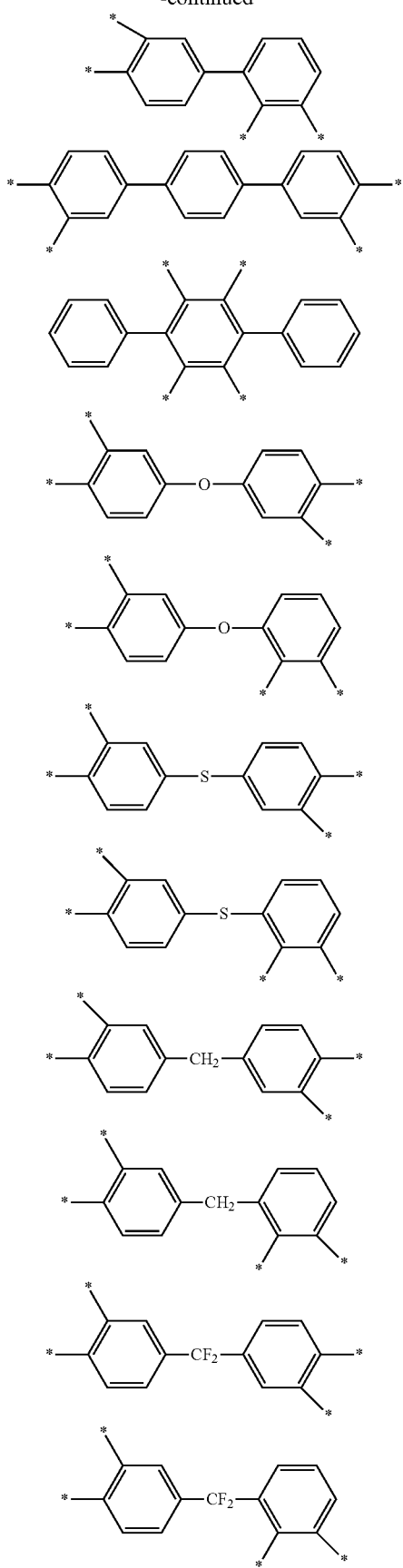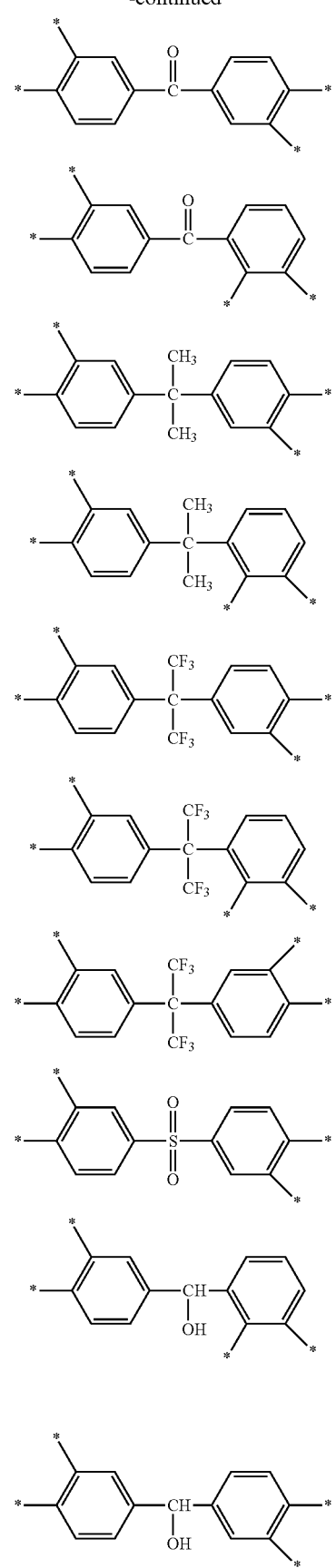

-continued

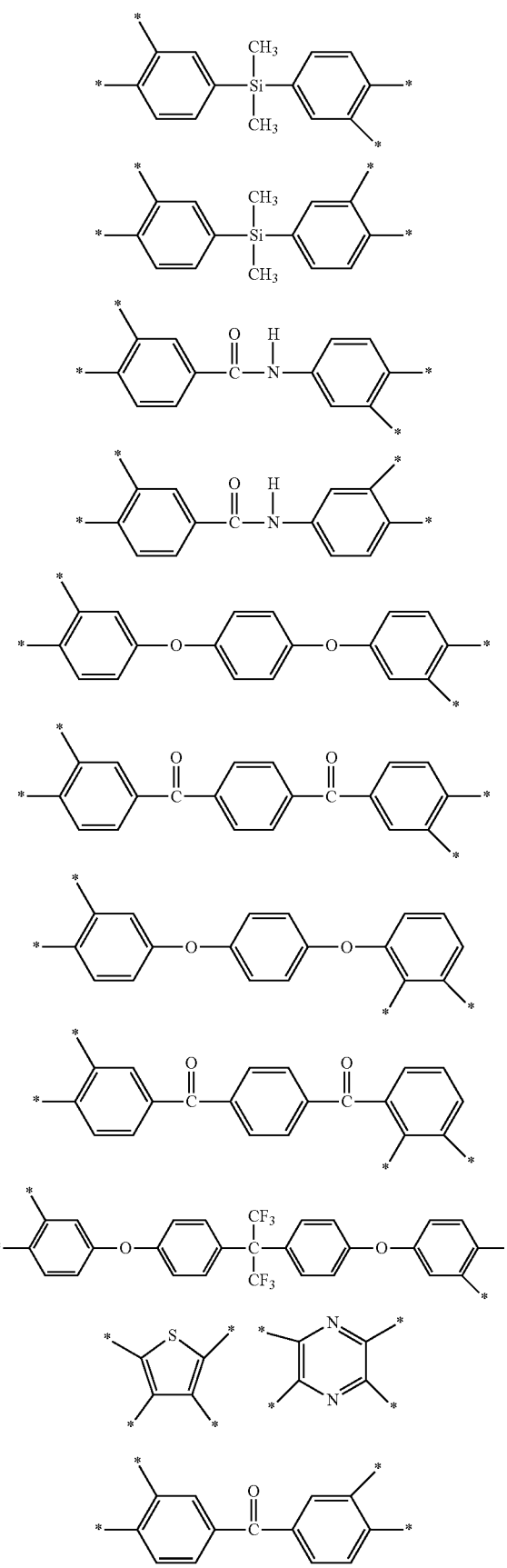

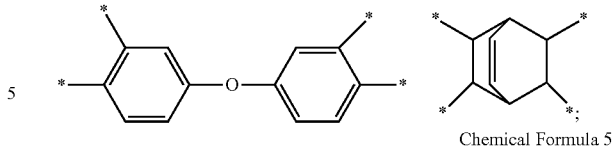

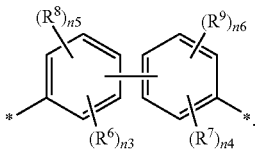

Chemical Formula 5

In Chemical Formula 5,

R$^6$ and R$^7$ are the same or different and are independently an electron withdrawing group selected from —CF$_3$, —CCl$_3$, —CBr$_3$, —CI$_3$, —F, —Cl, —Br, —I, —NO$_2$, —CN, —COCH$_3$, and —CO$_2$C$_2$H$_5$, R$^8$ and R$^9$ are the same or different and are independently a halogen, a hydroxy group, an alkoxy group (—OR$^{204}$, wherein R$^{204}$ is a C1 to C10 aliphatic organic group), a silyl group (—SiR$^{205}$R$^{206}$R$^{207}$, wherein R$^{205}$, R$^{206}$, and R$^{207}$ are the same or different and are independently hydrogen or a C1 to C10 aliphatic io organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and \* is a linking point to an adjacent atom;

Group 4

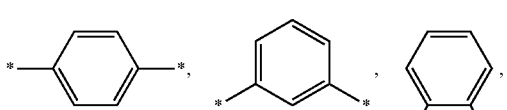

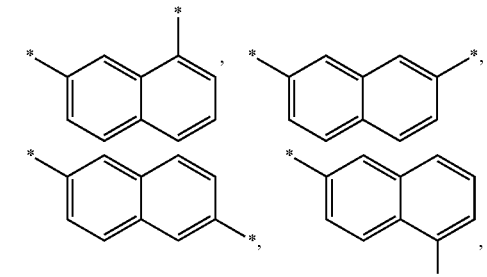

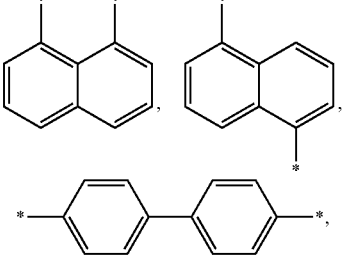

-continued

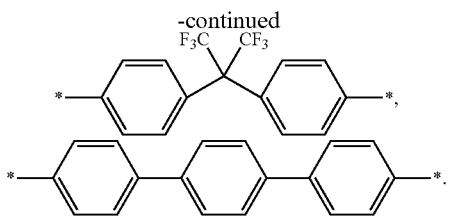

In the chemical formulae of Groups 2 and 4,
each residual group may be substituted or unsubstituted, and
* is a linking point to an adjacent atom.

Far still another embodiment provides an article including a polyamic acid or poly(amic acid-amide) copolymer according to an embodiment.

Yet still another embodiment provides a display device including an article according to an embodiment.

The polyimide or poly(imide-amide) copolymer according to an embodiment has improved mechanical properties, while maintaining good optical properties, by having a crosslinking through an amide bond between polymer chains.

BRIEF DESCRIPTIONS OF DRAWINGS

Figure 2:
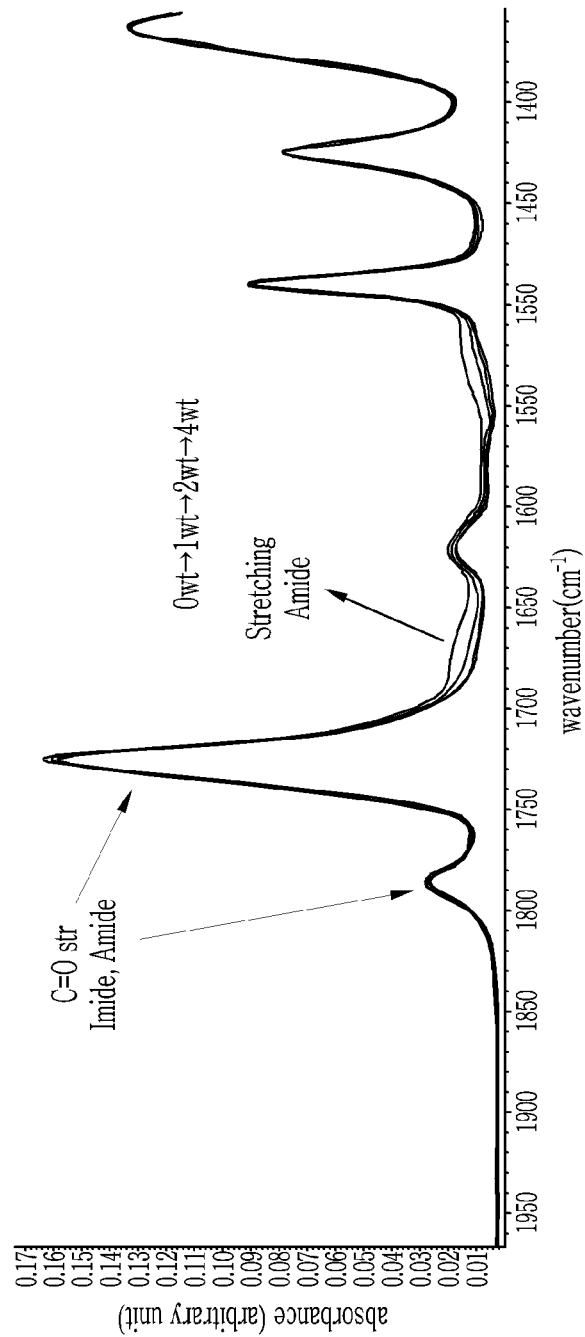

The above and other aspects, advantages and features of this disclosure will become more apparent by describing in further detail exemplary embodiments thereof with reference to the accompanying drawings, in which:

FIG. 1 shows FT-IR (Fourier transform infrared spectroscopy) graphs of absorbance (arbitrary units, a. u.) versus wavenumber (reverse centimeters, cm-1) obtained for the films according to Comparative Example 2, and Examples 2-1 to 2-3, respectively, and FIG. 2 shows FT-IR graphs of absorbance (arbitrary units, a. u.) versus wavenumber (reverse centimeters, cm-1) obtained for the films according to Comparative Example 3, and Examples 3-1 to 3-3, respectively.

DETAILED DESCRIPTION

This disclosure will be described more fully hereinafter, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Mixture" as used herein is inclusive of all types of combinations, including blends, alloys, solutions, and the like.

As used herein, when a specific definition is not otherwise provided, the term "substituted" refers to that at least one substituent selected from a halogen atom (F, Cl, Br, or I), a hydroxy group, a nitro group, a cyano group, an amino group ($-NH_2$, $-NH(R^{100})$ or $-N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxylic acid group, an ester group, a ketone group, a substituted or unsubstituted alkyl group, a substituted or unsubstituted alicyclic organic group (e.g., cycloalkyl group), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group, and a substituted or unsubstituted heterocyclic group, or the substituents may be linked to each other to provide a ring.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, and the term "alkenyl group" refers to a C2 to C30 alkenyl group, and specifically a C2 to C18 alkenyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, the term "aliphatic cyclic group" refers to a group derived from a cycloalkyne, a cycloalkene, or a cycloalkyne; the term "aromatic ring group" refers to a group derived from an arene (e.g., benzene, biphenyl, naphthalene, or the like); and the term "heteroaromatic ring group" refers to a group derived from a heteroaromatic compound comprising at least one selected from O, N, S, P, Si, or a combination thereof.

As used herein, the term "C1 to C10 aliphatic organic group" encompasses a C1 to C10 alkyl group, a C2 to C10 alkenyl group, a C2 to C10 alkynyl group, a C3 to C10 cycloalkyl group, C3 to C10 cycloalkenyl group, or a C3 to C10 cycloalkynyl group. As used herein, the term "C6 to C20 aromatic organic group" encompasses a C6 to C20 aryl group (e.g., phenyl group, a biphenyl group, a naphthyl group, or the like), and a C6 to C20 heteroaryl group (e.g., a pyridinyl group, a thiophenyl group, a pyrrolyl group, or the like).

As used herein, when specific definition is not otherwise provided, the term "combination" refers to mixing or copolymerization. Herein, "copolymerization" refers to a random copolymerization, a block copolymerization, or a graft copolymerization.

As used herein, the terms "polyimide" and "polyamic acid" may be used to have the same meanings.

In addition, in the specification, "*" may refer to a point of attachment to nitrogen, carbon, or another atom.

A polyimide or poly(imide-amide) copolymer film has high light transmittance, thermal stability, mechanical strength, flexibility, and the like, and thus, may be useful as a display substrate material. Recently, attempts have been made to use the polyimide or poly(imide-amide) copolymer film as a high hardness window film for replacing the uppermost glass disposed in a mobile device, such as a cellular phone, tablet personal computer, and the like. For this intended use, better mechanical and optical properties of the polyimide or poly(imide-amide) copolymer film are required.

Desired optical properties include high light transmittance, low yellowness index (YI), low YI difference after exposure to UV light, low haze, low refractive index (low reflection index), and the like. Mechanical properties, such as hardness, may be supplemented with a hard coating layer, but a base film having high toughness may ensure that a final film has high mechanical properties. It is difficult, however, to improve both mechanical and optical properties of the film at the same time, as the two properties, especially, tensile modulus and yellowness index of a polyimide or poly(imide-amide) film, are in a trade-off relationship with regard to each other.

Meanwhile, in an effort to improve mechanical properties of a poly(imide-amide) copolymer film, researchers prepared a poly(imide-amide) copolymer by increasing the amount of an amide structural unit, and/or by using a dianhydride having a rigid structure. In this case, however, tensile modulus is barely improved, while optical properties, such as YI, are deteriorated. Otherwise, refractive index of a film may increase to enhance reflection index, or toughness of the film may reduce.

The inventors of the subject matter of the present application have found a method for improving mechanical properties of the polyimide or poly(imide -amide) copolymer, such as, for example, a tensile modulus and/or a tensile stress at break, and the like, while maintaining good optical properties.

An embodiment provides a composition for preparing at least one of a polyimide or polyimide-amide) copolymer that includes at least one of a polyamic acid and a poly(amic acid-amide) copolymer, and at least one of a carbodiimide derivative and a carbodiimidazole derivative.

Carbodiimide derivatives or carbodimidazole derivatives are amide coupling agents known to form an amide bond at room temperature. Carbodiimide derivatives may be represented by chemical formula "R—N═C═N—R'" In an exemplary embodiment, N,N'-dicyclohexyl dicarbonate (DCC) or N,N'-diisopropyl dicarbonate (DIC) may be used, but the carbodiimide derivatives are not limited thereto, and other derivatives having various organic groups for R and R' in the chemical formula may be used. An exemplary schematic reaction for catalyzing an amide bond formation between a carboxylic acid group and an amino group by N,N'-dicyclohexyl dicarbonate (DCC) is shown as Reaction Scheme 1:

Reaction Scheme 1

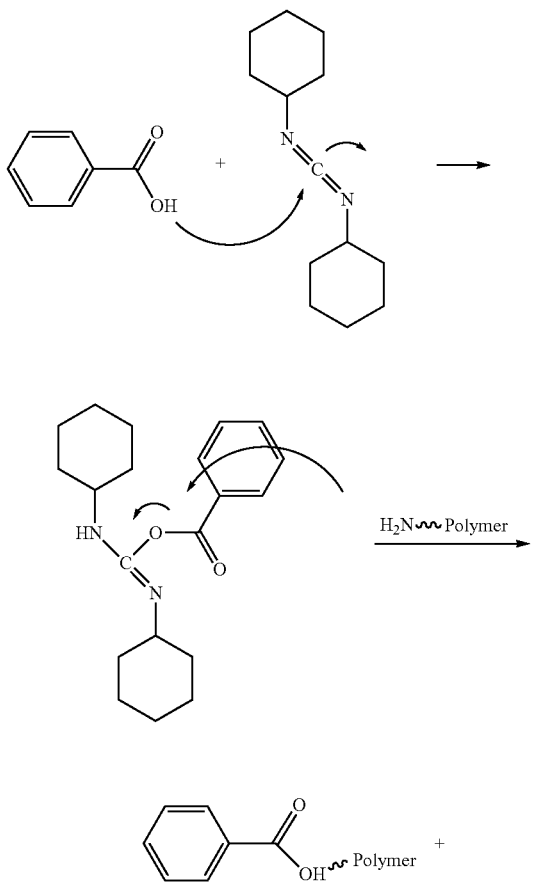

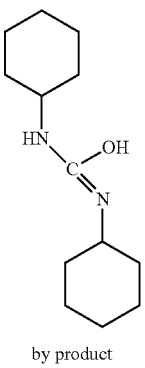

by product

A carbodiimidazole derivative may be represented by the following chemical formula:

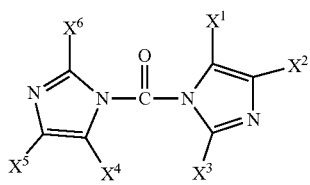

In the above chemical formula, $X^1$ to $X^6$ may be independently hydrogen or a substituted or unsubstituted C1 to C6 alkyl group.

An exemplary scheme illustrating an amide bonding mechanism by a carbodiimidazole may be represented by Reaction Scheme 2:

Reaction Scheme 2

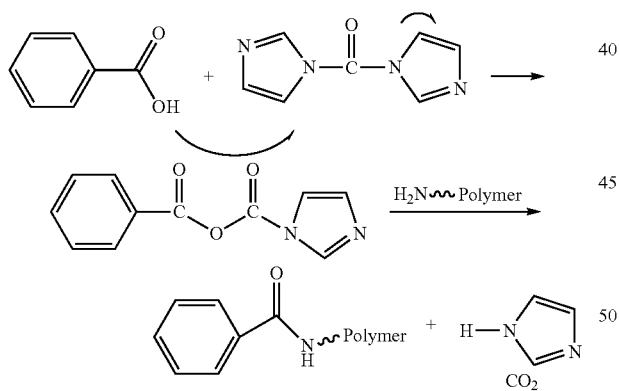

As shown in Reaction Schemes 1 and 2, a carbodiimide derivative or a carbodiimidazole derivative may form an amide bonding between a carboxylic acid group and an amino group.

Accordingly, in an embodiment, a composition for preparing a polyimide or a poly(imide-amide) copolymer is provided, wherein the composition includes at least one of a polyamic acid and a poly(amic acid-amide) copolymer, which are the precursors of a polyimide and a polyimide-amide) copolymer, respectively, and at least one of a carbodiimide derivative and a carbodiimidazole derivative, whereby the at least one of a carbodiimide derivative and a carbodiimidazole derivative provides a crosslinking between polymer chains by forming an amide group between a carboxylic acid group present in a polymer chain of the polyamic acid or poly(amic acid-amide) copolymer and an amino group present in another polymer chain of the polyamic acid or poly(amic acid-amide) copolymer to yield a final polyimide or a poly(imide-amide) copolymer having improved mechanical properties, while maintaining good optical properties.

As shown in the following Examples of the application, an amount the carbodiimide derivative or the carbodiimidazole derivative in the composition may be less than or equal to about 20 percent by weight (weight %), for example, less than or equal to about 18 weight %, for example, between about 0.1 weight % and about 15 weight %, for example, between about 0.5 weight % and about 15 weight %, for example, between about 1 weight % and about 15 weight %, for example, between about 1 weight % and about 12 weight %, and for example, between about 1 weight % and about 10 weight %, based on the total weight of the finally prepared polyimide or poly(imide-amide) copolymer.

The composition including a carbodiimide derivative or a carbodiimidazole derivative in the above ranges may form a crosslinking through an amide bond between polyamic acid or poly(amic acid-amide) copolymer chains, from which the prepared polyimide or poly(imide-amide) copolymer may have improved mechanical properties, while maintaining good optical properties.

The polyamic acid or poly(amic acid-amide) copolymer included in the composition may be any polyamic acid or poly(amic acid-amide) copolymer suitable for preparing an optical film, and thus, the polyamic acid or poly(amic acid-amide) copolymer included in the composition is not limited to a specific type. In an exemplary embodiment, the polyamic acid or the poly(amic acid -amide) copolymer may include a polyamic acid including a structural unit represented by Chemical Formula 1, or a poly(amic acid-amide) copolymer including a structural unit represented by Chemical Formula 3, as they both have excellent optical properties, as well as good mechanical properties:

Chemical Formula 1

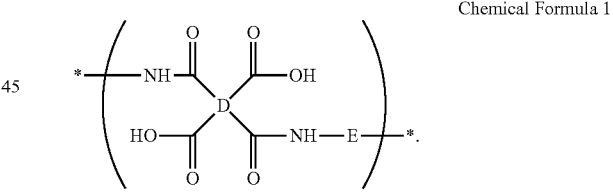

In Chemical Formula 1,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, and

* is a linking point to an adjacent atom;

Chemical Formula 3

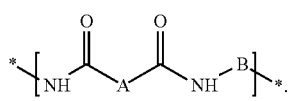

In Chemical Formula 3,

A and B are independently a substituted or unsubstituted divalent C6 to C24 aliphatic cyclic group, a substituted or unsubstituted divalent C6 to C24 aromatic ring group, or a substituted or unsubstituted divalent C4 to C24 hetero aromatic ring group, wherein the aliphatic cyclic group, the aromatic ring group, or the hetero aromatic ring group is present as a single ring, as a condensed ring system including two or more fused rings, or as a system including two or more moieties selected from the single ring and the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, and

* is a linking point to an adjacent atom.

D in Chemical Formula 1 may be selected from the chemical formulae of Group 1:

Group 1

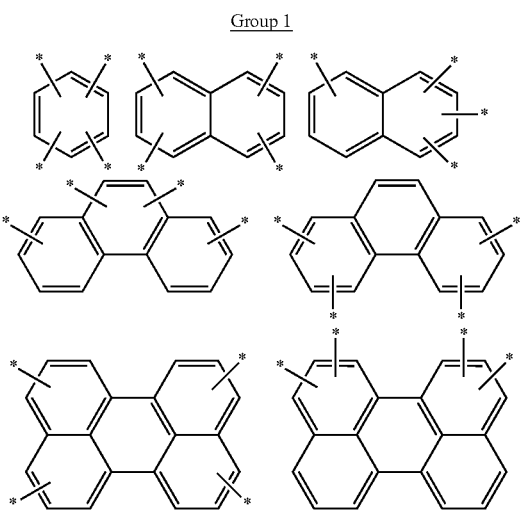

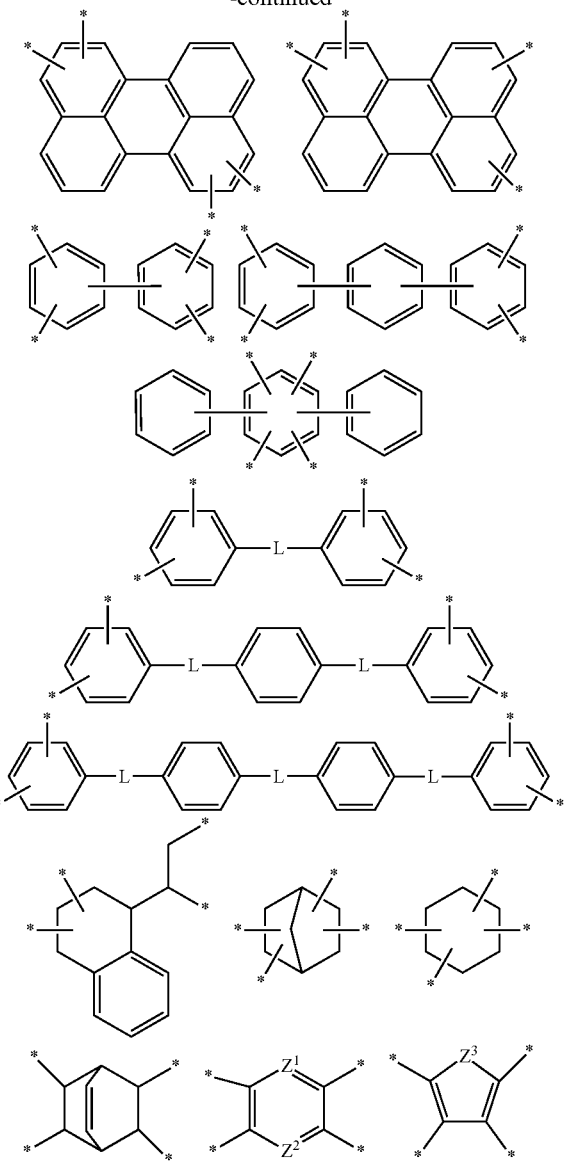

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

The chemical formulae of Group 1 may be represented by the chemical formulae of Group 2, but are not limited thereto:

Group 2
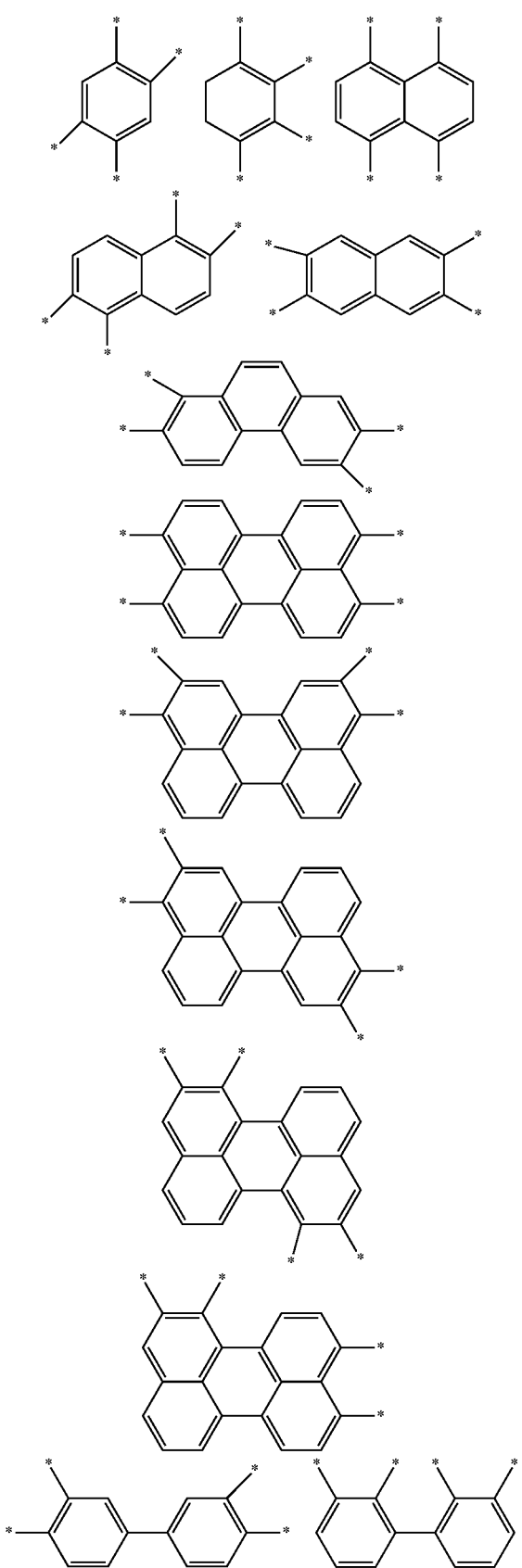
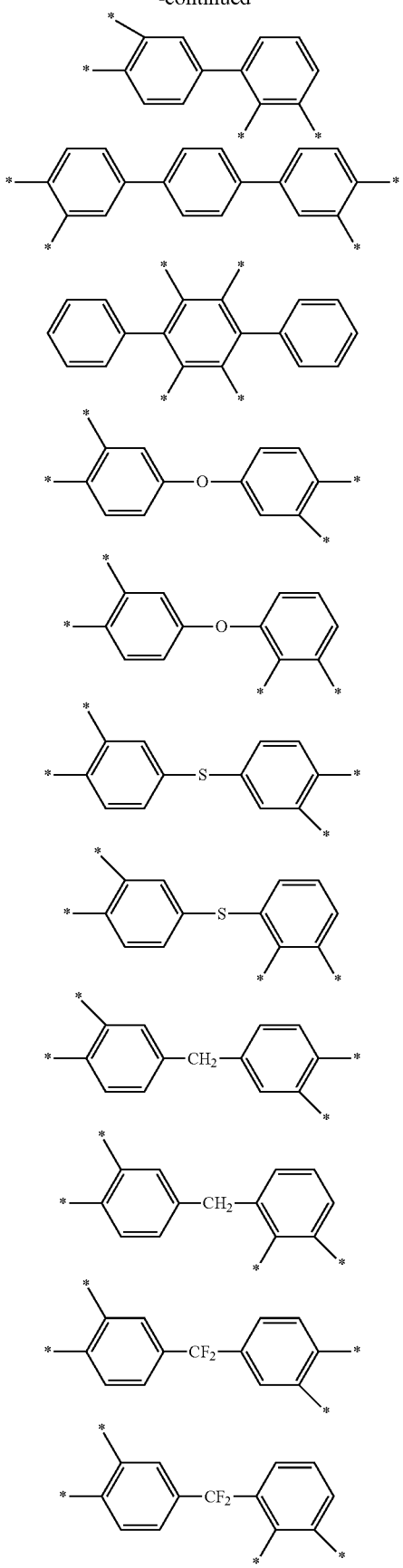

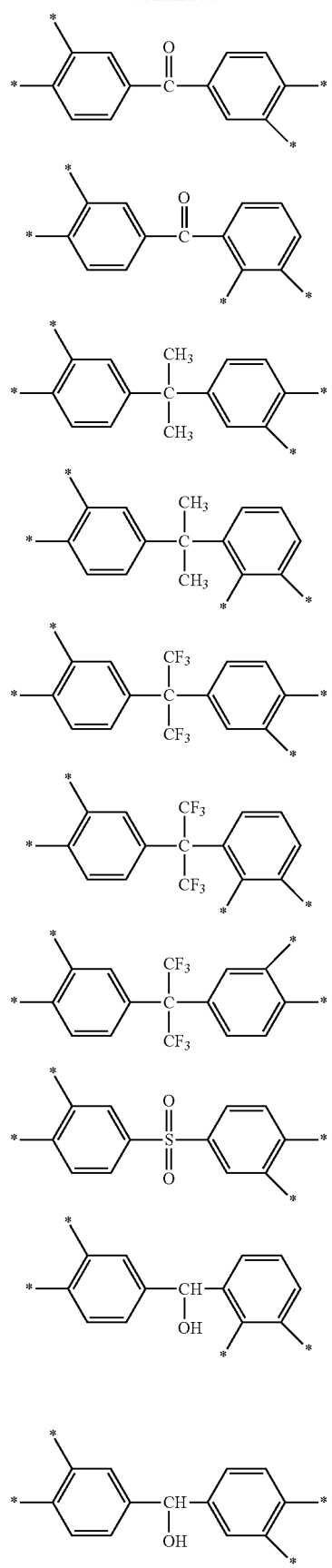
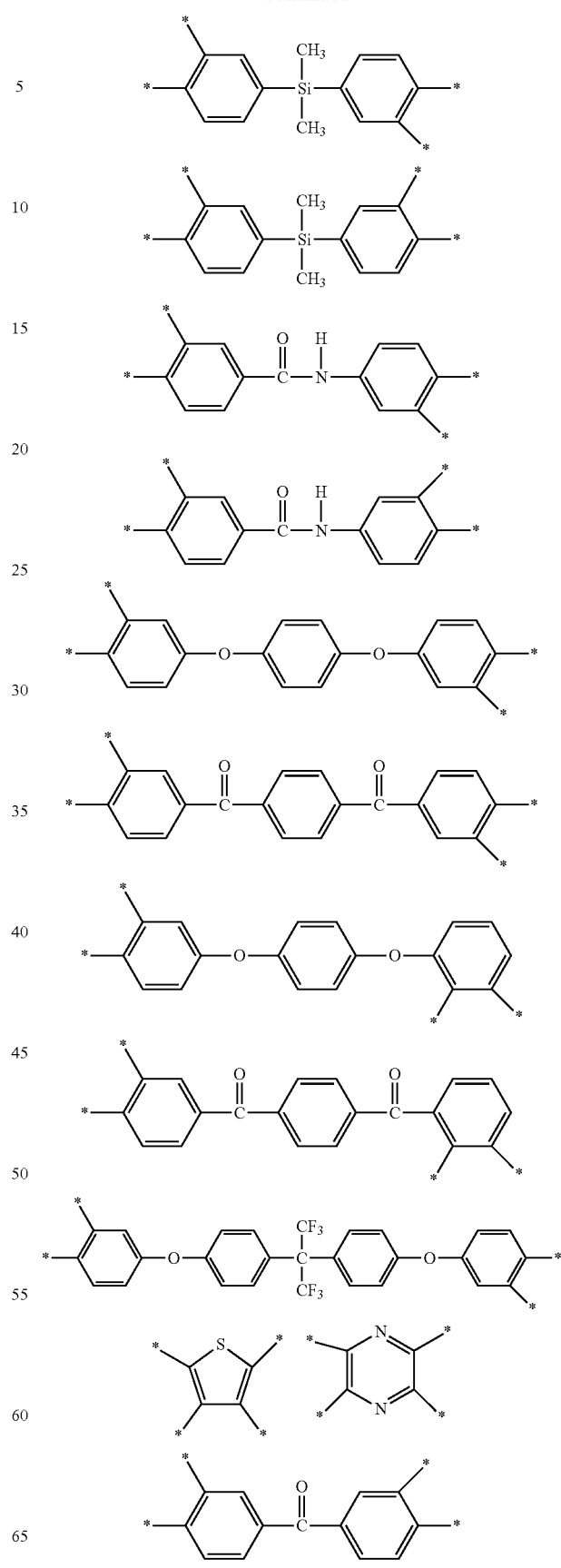

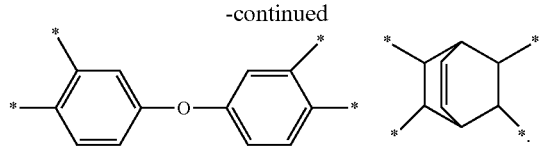

In the chemical formulae of Group 2,
each residual group may be substituted or unsubstituted, and
* may be a linking point to an adjacent atom.
E in Chemical Formula 1 and B in Chemical Formula 3 may be represented by Chemical Formula 5:

Chemical Formula 5

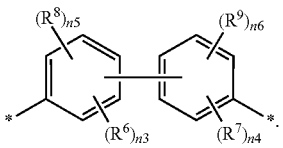

In Chemical Formula 5,
$R^6$ and $R^7$ are the same or different and are independently an electron withdrawing group, for example, $-CF_3$, $-CCl_3$, $-CBr_3$, $-Cl_3$, $-F$, $-Cl$, $-Br$, $-I$, $-NO_2$, $-CN$, $-COCH_3$, and $-CO_2C_2H_5$,
$R^8$ and $R^9$ are the same or different and are independently a halogen, a hydroxy group, an alkoxy group ($-OR^{204}$, wherein $R^{204}$ is a C1 to C10 aliphatic organic group), a silyl group ($-SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group,
n3 is an integer ranging from 1 to 4, n5 is an integer ranging from 0 to 3, provided that n3+n5 is an integer of 4 or less,
n4 is an integer ranging from 1 to 4, n6 is an integer ranging from 0 to 3, provided that n4+n6 is an integer of 4 or less, and
* is a linking point to an adjacent atom.
In an exemplary embodiment, A in Chemical Formula 3 may be selected from chemical formulae represented by Group 3:

Group 3

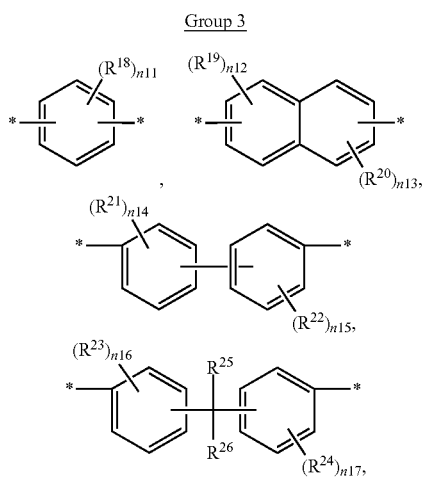

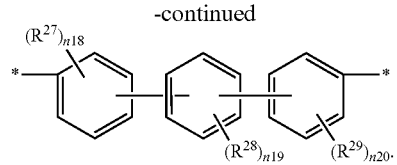

In the chemical formulae represented by Group 3,
$R^{18}$ to $R^{29}$ are the same or different and are independently deuterium, a halogen, a substituted or unsubstituted C1 to C10 aliphatic organic group, or a substituted or unsubstituted C6 to C20 aromatic organic group,
n11 and n14 to n20 are independently an integer ranging from 0 to 4,
n12 and n13 are independently an integer ranging from 0 to 3, and
* is a linking point to an adjacent atom.
In an exemplary embodiment, the chemical formulae of Group 3 may be, for example, represented by chemical formulae of Group 4, but are not limited thereto:

Group 4

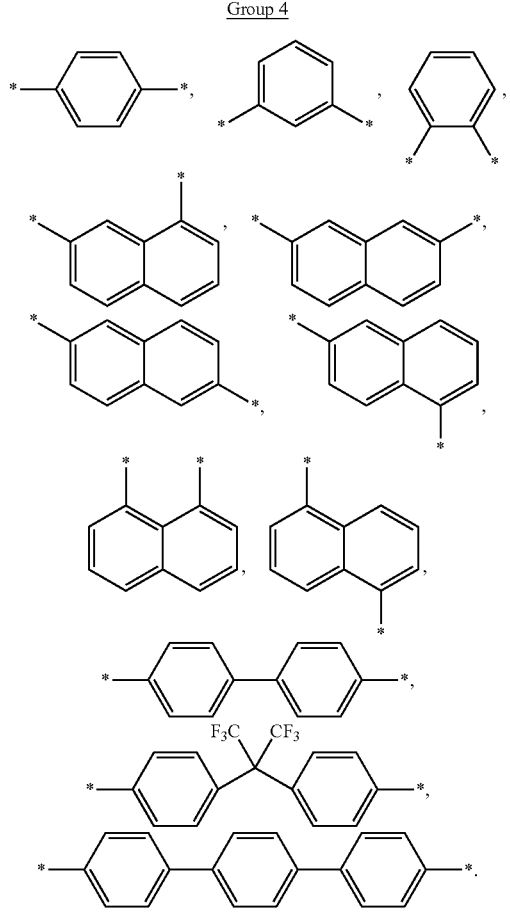

In the chemical formulae of Group 2,
each residual group may be substituted or unsubstituted, and
* may be a linking point to an adjacent atom.
Another embodiment provides a polyamic acid or poly(amic acid-amide) copolymer including a crosslinking through an amide bond between polymer chains, which is prepared from the composition according to an embodiment.

As described above, the polyamic acid or the poly(amic acid-amide) copolymer may be suitable for use in an optical film, and is not limited to a specific type. However, in an exemplary embodiment, the polyamic acid including a structural unit represented by Chemical Formula 1, or the poly(amic acid-amide) copolymer including a structural unit represented by Chemical Formula 1 and a structural unit represented by Chemical Formula 3 has good optical and mechanical properties. Accordingly, in an exemplary embodiment, the polyamic acid or the poly(amic acid-amide) copolymer prepared from the composition according to an embodiment may be the polyamic acid including a structural unit represented by Chemical Formula 1, or the poly(amic acid-amide) copolymer including a structural unit represented by Chemical Formula 1 and a structural unit represented by Chemical Formula 3, wherein a crosslinking through an amide bond between polymer chains may be formed by a carboxylic acid group present in the structural unit represented by Chemical Formula 1 included in at least one of the polyamic acid and the poly(amic acid-amide) copolymer, and an amino group present in another polyamic acid or poly(amic acid-amide) copolymer.

For example, the polyamic acid or poly(amic acid-amide) copolymer may be represented by Chemical Formula 6:

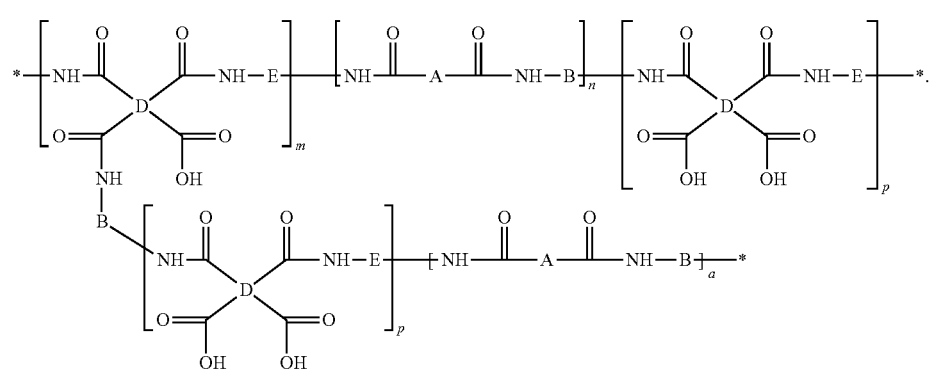

Chemical Formula 6

In Chemical Formula 6,
D and E are the same as in Chemical Formula 1,
A and B are the same as in Chemical Formula 3,
m and p are independently an integer ranging from 1,
n is an integer ranging from 0, and
* is a linking point to an adjacent atom.

In Chemical Formula 6, if n is zero (0), the Chemical Formula 6 may be a polyamic acid that includes only amic acid structural unit.

In Chemical Formula 6, if n is greater than or equal to 1, the Chemical Formula 6 may be a poly(amic acid-imide) copolymer that includes amic acid structural unit, as well as amide structural unit.

As depicted in Chemical Formula 6, the polyamic acid or poly(amic acid -imide) copolymer may include a crosslinking between two or more polymer chains through an amide bonding between a carboxylic acid group present in a polymer chain and an amino group present in another polymer chain. In Chemical Formula 6, although only one carboxylic acid group of two carboxylic acid groups present in an amic acid structural unit is converted to an amide bond, the two carboxylic acid groups may be converted to two amide bonds with two amino groups present in an end of two different polymer chains.

In Chemical Formula 6, D may be selected from Group 1, E and B may be independently selected from Chemical Formula 5, and A may be selected from Group 3:

Group 1

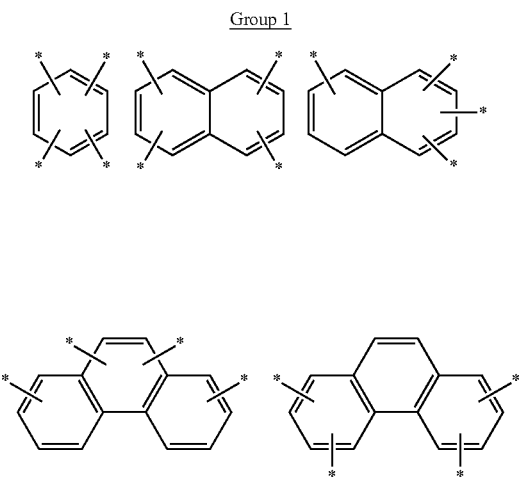

-continued

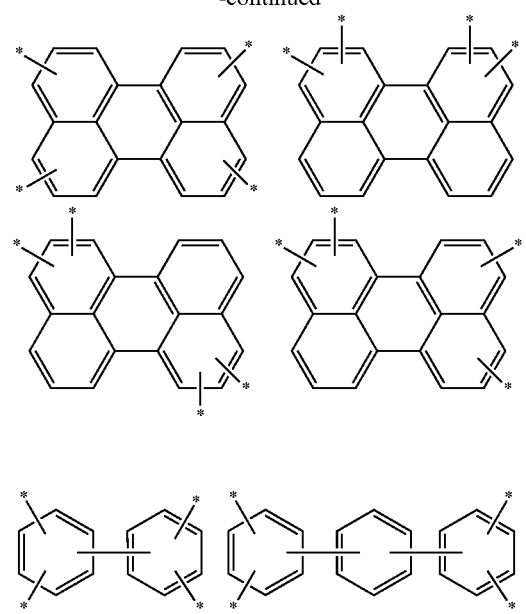

-continued

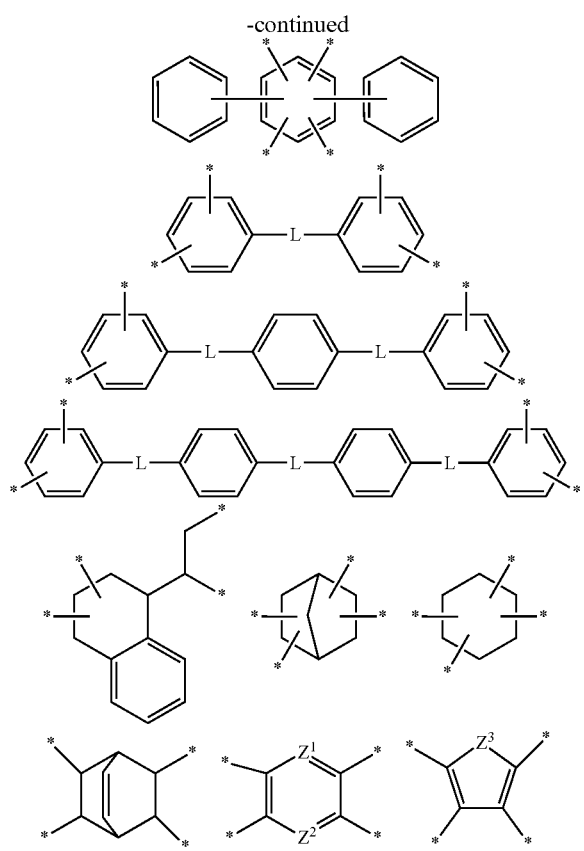

wherein, in the chemical formulae of Group 1,
each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, \* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group;

Chemical Formula 5

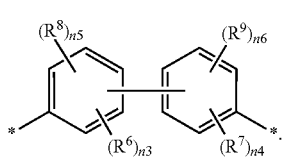

In Chemical Formula 5,
R$^6$ and R$^7$ are the same or different and are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$,
R$^8$ and R$^9$ are the same or different and are independently a halogen, a hydroxy group, an alkoxy group (—OR$^{204}$, wherein R$^{204}$ is a C1 to C10 aliphatic organic group), a silyl group (—SiR$^{205}$R$^{206}$R$^{207}$, wherein R$^{205}$, R$^{206}$, and R$^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and \* is a linking point to an adjacent atom;

Group 3

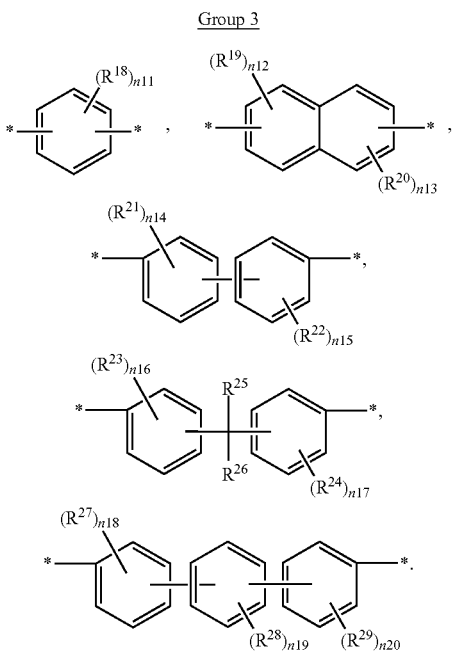

In the chemical formulae of Group 3,
R$^{18}$ to R$^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and \* is a linking point to an adjacent atom.

The chemical formulae of Group 1 may be represented by the chemical formulae of Group 2, and the chemical formulae of Group 3 may be represented by the chemical formulae of Group 4.

Still another embodiment provides a polyimide or poly(imide-amide) copolymer including a crosslinking through an amide bond between polymer chains prepared from a composition or a polyamic acid or poly(amic acid -amide) copolymer according to an embodiment.

The polyimide or poly(imide-amide) copolymer may be prepared by thermally or chemically imidizing a polyamic acid or poly(amic acid-amide) copolymer prepared from the composition according to an embodiment and having a crosslinking between the polyamic acids or poly(amic acid-amide) copolymer chains.

Although an amic acid structural unit in the polyamic acid or poly(amic acid-amide) copolymer may be converted to an imide structural unit due to dehydration and cyclization by the thermal or chemical imidization, an amic acid structural unit including the crosslinking is not converted into an imide structural unit, but maintains the crosslinking as shown in Chemical Formula 6. Therefore, a polyimide or poly(imide-amide) copolymer having a crosslinking through an amide bond between polymer chains according to an embodiment includes less amount of imide structural unit and greater amount of amide bond than a polyimide or polyimide-amide) copolymer prepared by not including an amide coupling agent, such as, for example, a carbodiimide derivative or carbodiimidazole derivative. The difference in the amount of the imide structural unit and/or amide bond may be confirmed by an FT-IR spectrum.

For example, as shown in FIG. 1 and FIG. 2 of the present application, both the polyimide prepared by reacting 2,2'-bis(trifluoromethyl)benzidine (TFDB), 4,4'-(hexafluoroisopropylidene)diphthalic anhydride (6FDA), and 3,3',4,4'-biphenyl tetracarboxylic dianhydride (BPDA) (FIG. 1), and the polyimide prepared by reacting 2,2'-bis(trifluoromethyl) benzidine (TFDB), and 4,4'-(hexafluoroisopropylidene) diphthalic anhydride (6FDA) show gradually decreasing peaks of imide bond and gradually increasing peaks of amide bond, as an amount of N,N'-diisopropyl carbodiimide (DCC) or N,N'-dicyclohexyl carbodiimide (DIC) as an amide coupling agent in a composition for preparing the polyimide or the poly(imide-amide) copolymer gradually increases as 1 weight %, 2 weight %, and 4 weight %, compared with the polyimide or poly(imide-amide) copolymer prepared from a composition that does not include DCC or DIC. That is, a polyimide or poly(imide-amide) copolymer prepared from a composition including the amide coupling agent has actually include a crosslinking through an amide bond between the polymer chains.

Accordingly, in an exemplary embodiment, a polyimide or poly(imide -amide) copolymer prepared by thermally or chemically imidizing a polyamic acid or poly(amic acid-imide) copolymer represented by Chemical Formula 6 may be represented by Chemical Formula 7:

In Chemical Formula 7, if n is greater than or equal to 1, the Chemical Formula 7 may be a poly(imide-amide) copolymer that includes an imide structural unit, as well as an amide structural unit, along with a crosslinking through an amide bond between the polymer chains.

In Chemical Formula 7, D may be selected from Group 1, E and B may be independently selected from Chemical Formula 5, and A may be selected from Group 3:

Group 1

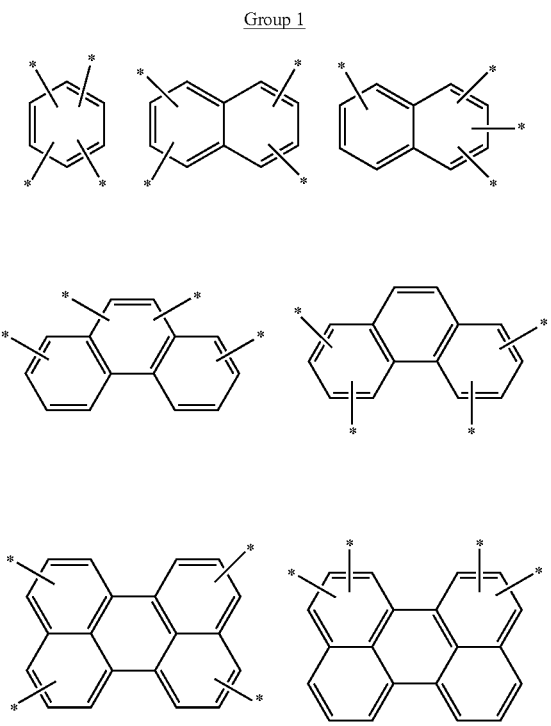

Chemical Formula 7

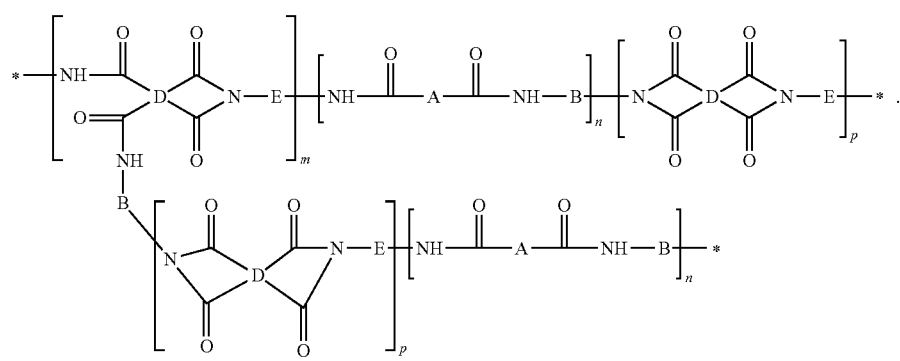

In Chemical Formula 7,
D and E are the same as in Chemical Formula 1,
A and B are the same as in Chemical Formula 3,
m and p are independently an integer ranging from 1,
n is an integer ranging from 0, and
* is a linking point to an adjacent atom.

In Chemical Formula 7, if n is zero (0), the Chemical Formula 7 may be a polyimide that includes only an imide structural unit and a crosslinking through an amide bond between the polymer chains.

-continued

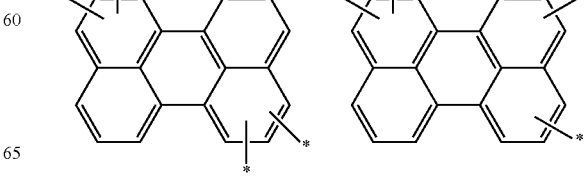

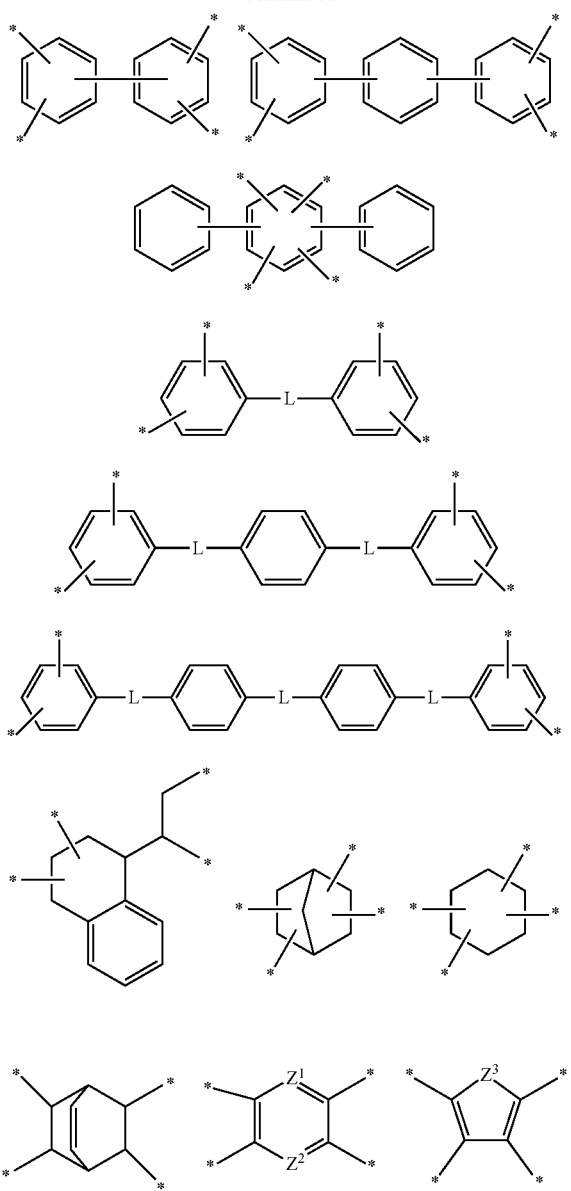

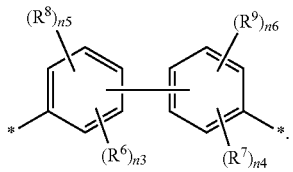

Chemical Formula 5

In Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom;

Group 3

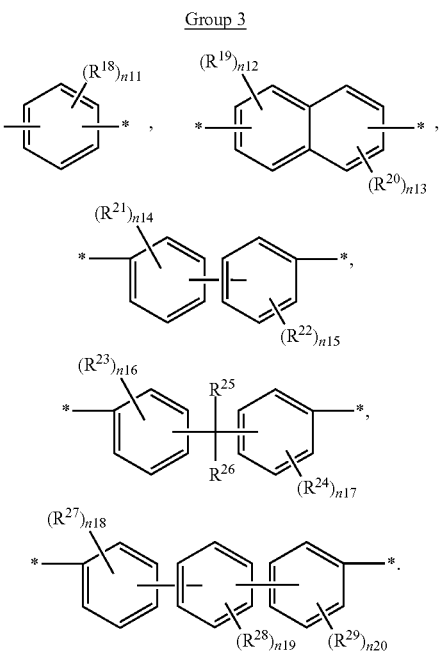

In the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and

* is a linking point to an adjacent atom.

wherein, in the chemical formulae of Group 1, each residual group may be substituted or unsubstituted, and each L may be the same or different and may be independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C($R^{100}$)=, wherein $R^{100}$ is hydrogen or a C1 to C5 alkyl group, provided that $Z^1$ and $Z^2$ are not simultaneously —C($R^{100}$)=, and $Z^3$ is —O—, —S—, or —$NR^{101}$—, wherein $R^{101}$ is hydrogen or a C1 to C5 alkyl group;

In an exemplary embodiment, a reaction sequence for preparing a poly(imide-amide) copolymer, which may be prepared by reacting TFDB as a diamine, BPDA and 6FDA as dianhydrides, and TPCl as a dicarboxylic halide to prepare a poly(amic acid-amide) copolymer, adding DCC or DIC as an amide coupling agent to the poly(amic acid-amide) copolymer to react to prepare a poly(amic acid-amide) copolymer having a crosslinking through an amide bond between polymer chains, and thermally or chemically imidizing the prepared poly(amic acid-amide) copolymer having a crosslinking through an amide bond between polymer chains, may be represented by Reaction Scheme 3:

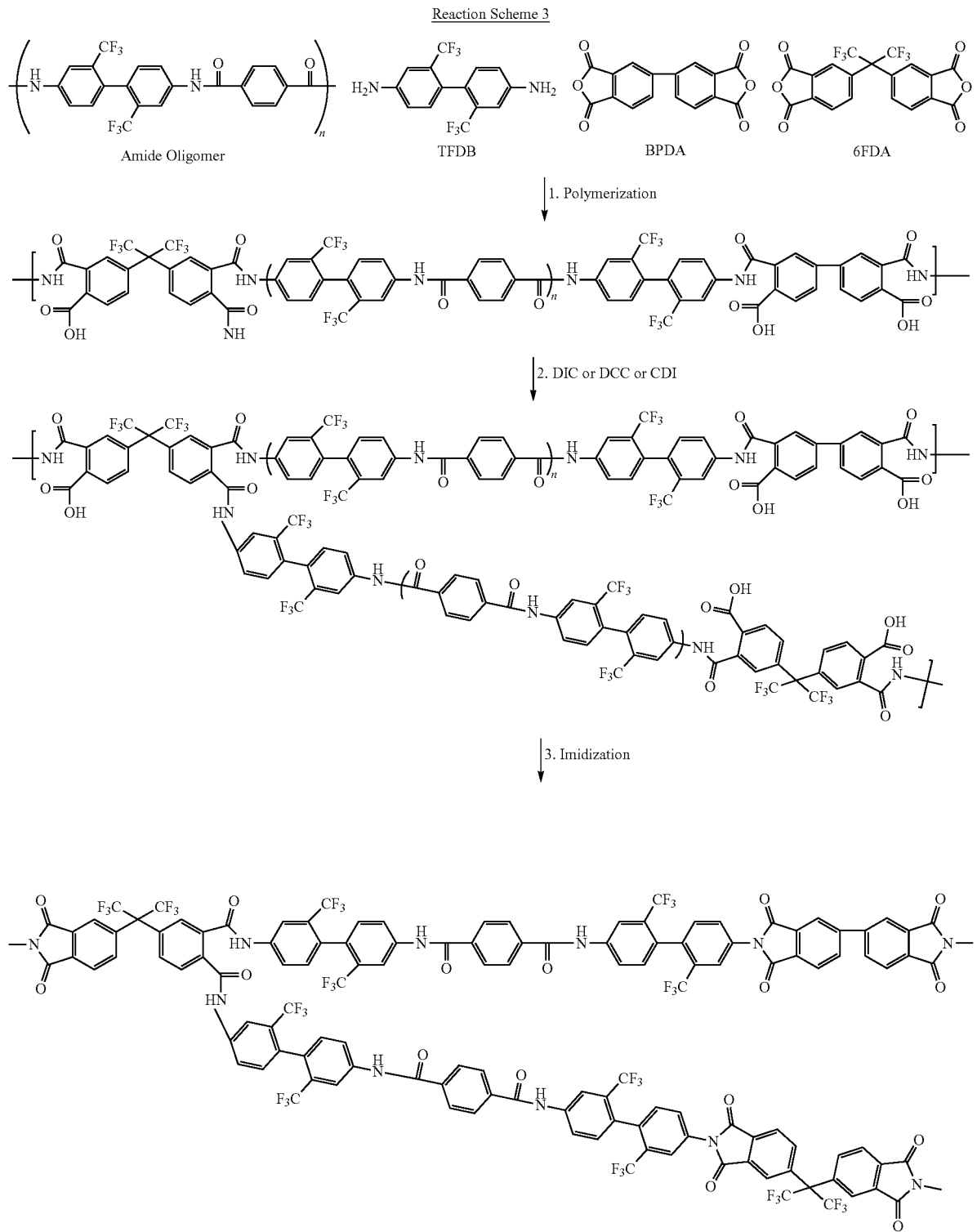

In the above reaction, the step for preparing a polyamic acid by reacting a diamine and a dianhydride, or the step for preparing a poly(amic acid-amide) copolymer by further reacting a dicarboxylic halide is well-known to persons skilled in the art to which the present inventive concept pertains.

Examples of diamine compounds useful for preparing a polyamic acid according to embodiment may include at least one selected from 2,2'-bistrifluoromethyl-4,4'-biphenyl-diamine (TFDB); m-phenylene diamine; p -phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis (4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis(4-aminophenyl)-N-methylamine; 1,2-diamino-naphthalene; 1,4-diamino -naphthalene; 1,5-diamino-naphthalene; 1,6-diamino-naphthalene; 1,7-diamino -naphthalene; 1,8-diamino-naphthalene; 2,3-diamino-naphthalene; 2,6-diamino -naphthalene; 1,4-diamino-2-methyl-naphthalene; 1,5-diamino-2-methyl -naphthalene; 1,3-diamino-2-phenyl -naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino -benzene; 1,4-diamino-2-methoxy-5-methyl-benzene; 1,4-diamino-2,3,5,6-tetra methyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o -xylylene diamine; m-xylylene diamine; p-xylylene diamine; 3,3'-diamino -benzophenone; 4,4'-diamino-benzophenone; 2,6-diamino-pyridine; 3,5-diamino -pyridine; 1,3-diamino-adamantane; bis[2-(3-aminophenyl) hexafluoroisopropyl] diphenyl ether; 3,3'-diamino-1,1'-di-adamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-am inophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl -2,2,2-trifluoroethane; 1,1-bis[4-(4-aminophenoxy)phenyl]-1-phenyl-2,2,2-trifluoroethane; 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminobicyclohexylmethane, and diaminofluorene. Such diamine compounds may be commercially available or may be obtained by a well-known method.

For example, the diamine compound may be selected from compounds of the following structures:

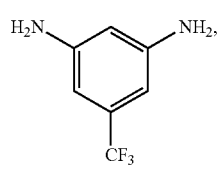
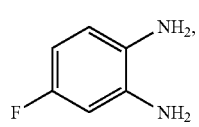

-continued

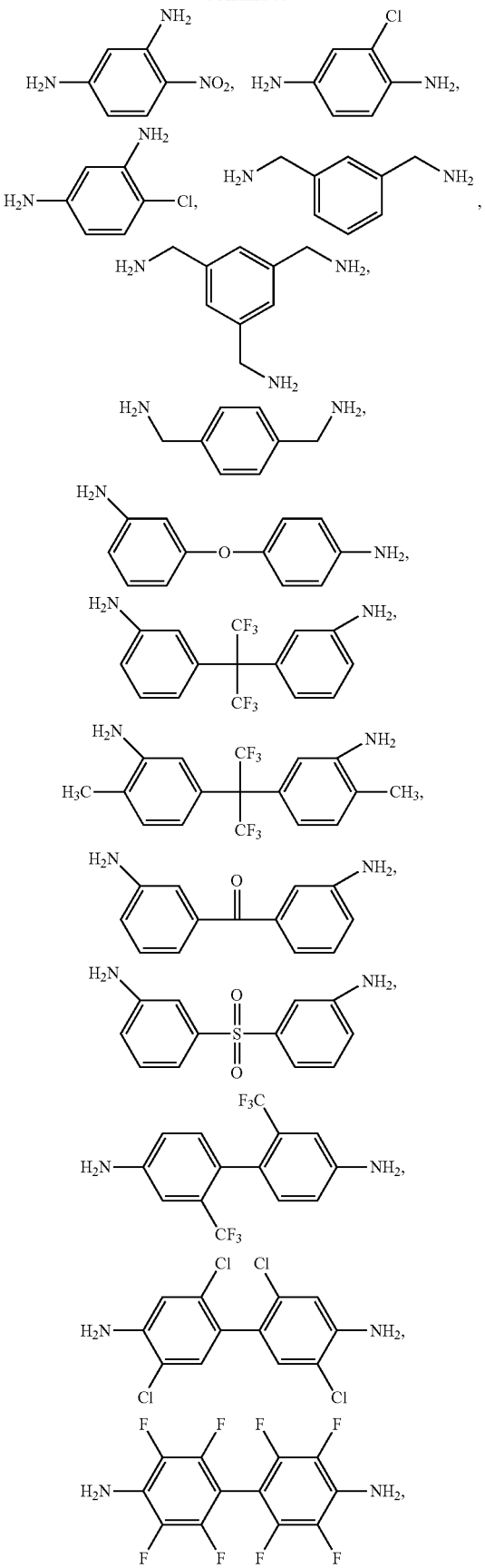

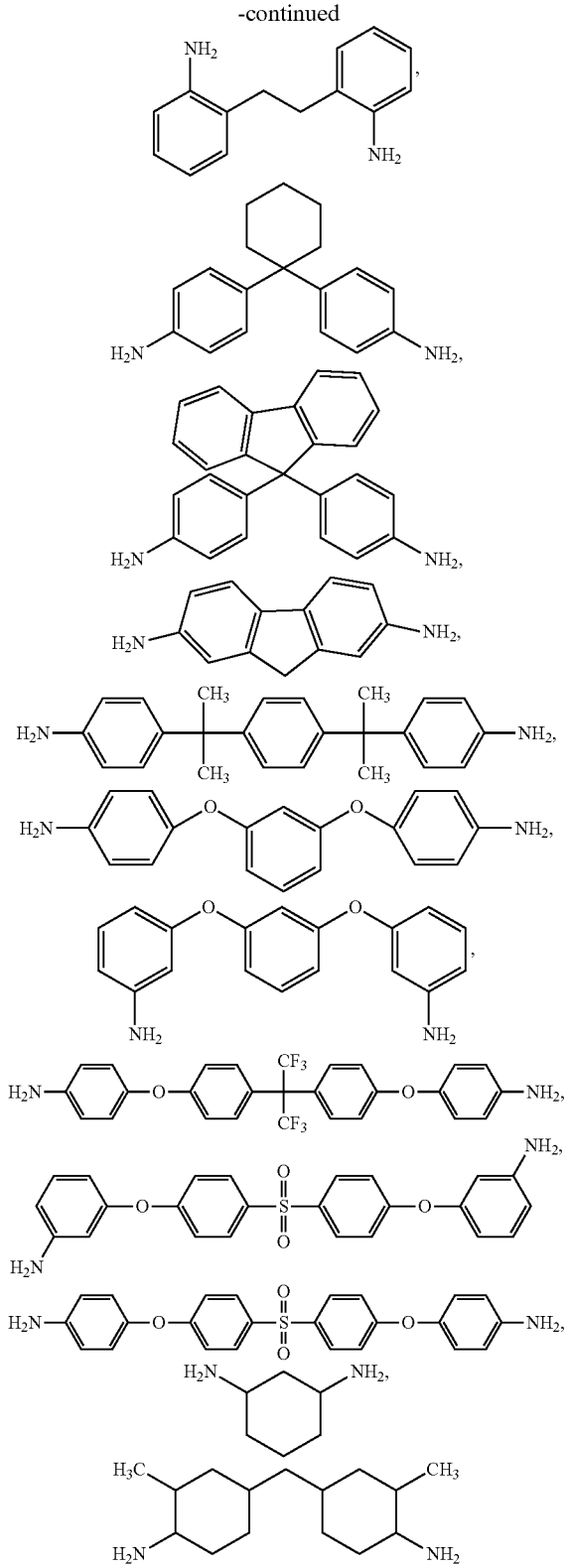

In an exemplary embodiment, the diamine may be 2,2'-bis(trifluoromethyl)benzidine (TFDB).

The dianhydride may be a tetracarboxylic dianhydride, and such a compound may be 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenyl sulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-biphenyl tetracarboxylic dianhydride; 4,4'-bis(3,4-dicarboxyphenoxy)biphenyl dianhydride; bis(2,3-dicarboxyphenyl) ether dianhydride; 4,4'-bis(2,3-dicarboxyphenoxy) diphenyl ether dianhydride; 4,4'-bis(3,4-dicarboxyphenoxy) diphenyl ether dianhydride; bis(3,4-dicarboxyphenyl) sulfide dianhydride; 4,4'-bis(2,3-dicarboxyphenoxy) diphenyl sulfide dianhydride; 4,4'-bis(3,4-dicarboxyphenoxy) diphenyl sulfide dianhydride; bis(3,4-dicarboxyphenyl) sulfone dianhydride; 4,4'-bis(2,3-dicarboxyphenoxy) diphenyl sulfone dianhydride; 4,4'-bis(3,4-dicarboxyphenoxy) diphenyl sulfone dianhydride; 3,3',4,4'-benzophenone tetracarboxylic dianhydride; 2,2',3,3'-benzophenone tetracarboxylic dianhydride; 2,3,3'4'-benzophenone tetracarboxylic dianhydride; 4,4'-bis(3,4-dicarboxyphenoxy) benzophenone dianhydride; bis(2,3-dicarboxyphenyl) methane dianhydride; bis(3,4-dicarboxyphenyl) methane dianhydride; 1,1-bis(2,3-dicarboxyphenyl) ethane dianhydride; 1,1-bis(3,4-dicarboxyphenyl) ethane dianhydride; 1,2-bis(3,4-dicarboxyphenyl) ethane dianhydride; 2,2-bis(2,3-dicarboxyphenyl) propane dianhydride; 2,2-bis(3,4-dicarboxyphenyl) propane dianhydride; 2,2-bis[4-(2,3-dicarboxylphenoxy) phenyl] propane dianhydride; 2,2-bis[4-(3,4-dicarboxylphenoxy) phenyl] propane dianhydride; 2,2-bis[4-(2,3-dicarboxylphenoxy)-4'-(3,4-dicarboxylphenoxy) diphenyl] propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis[4-(3,4-dicarboxylphenoxy) phenyl]-1-phenyl-2,2,2-trifluoroethane dianhydride; and 4,4'-bis[2-(3,4-dicarboxylphenyl)hexafluoroisopropyl] diphenyl ether dianhydride. Such anhydride compounds may be commercially available or may be obtained by a well-known method.

In an exemplary embodiment, the tetracarboxylic acid dianhydride may be 3,3',4,4'-biphenyl tetracarboxylic dianhydride (BPDA), 4,4'-(hexafluoroisopropylidene) diphthalic anhydride (6FDA), or a combination thereof.

On the other hand, the well-known polyamide manufacturing method may include low temperature solution polymerization, interface polymerization, fusion polymerization, solid-phase polymerization, and the like. For example, the low temperature solution polymerization may be performed by reacting a dicarboxylic dihalide and a diamine in an aprotic polar solvent to form the amide structural unit represented by Chemical Formula 3.

The dicarboxylic dihalide may be at least one selected from terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoro-terephthaloyl chloride, and a combination thereof.

In an exemplary embodiment, the dicarboxylic dihalide may be terephthaloyl chloride (TPCl).

A diamine for forming the amide structural unit may be the same diamine compound as used for forming the imide structural unit. In other words, the amide structural unit may be formed by using at least one kind of the same or different diamine among the aforementioned diamine compounds.

In an exemplary embodiment, a diamine for forming an amide structural unit with the dicarboxylic dihalide may be 2,2'-bis(trifluoromethyl)benzidine (TFDB).

The aprotic polar solvent may be, for example, a sulfoxide based solvent such as dimethyl sulfoxide, diethyl sulfoxide and the like, a formamide based solvent such as N,N-dimethyl formamide, N,N-diethylformamide, and the like, an acetamide based solvent such as N,N-dimethyl acetamide, N,N-diethylacetamide and the like, a pyrrolidone based solvent such as N-methyl-2-pyrrolidone, N-vinyl-2-pyrrolidone and the like, a phenol based solvent such as phenol, o-, m- or p-cresol, xylenol, halogenated phenol, catechol, and the like, or hexamethylphosphoramide, y-butyrolactone, and the like. These solvents may be used alone or as a mixture. However, the examples of solvents are not limited thereto, and an aromatic hydrocarbon such as xylene and toluene may also be used.

The amide structural unit is formed by placing a diamine and a dicarboxylic dihalide in the same reactor and allowing them to react. The diamine and dianhydride for forming the imide and/or amic acid structural unit are then added thereto and reacted therewith to prepare a poly(amic acid -amide) copolymer.

Alternatively, the diamine and the dicarboxylic dihalide for forming the amide structural unit are reacted to prepare an amide oligomer having an amino group at both ends thereof, and a dianhydride is added to the resultant, which is used as a diamine monomer, to prepare a poly(amic acid-amide) copolymer. The latter method may require no precipitation process for removing HCl generated from a process of forming amide, and thus, the method may shorten a process time and increase a yield of producing a final product, the poly(amide-imide) copolymer.

Still another embodiment provides an article including a polyimide or poly(imide-amide) copolymer according to an embodiment.

The article may include a film, a fiber, a coating material, an adhesive, and the like, and in an exemplary embodiment, the article may be a film.

As described above, a polyimide or poly(imide-amide) copolymer according to an embodiment has improved mechanical properties, such as, for example, a tensile modulus, a tensile stress, and the like, while maintaining good optical properties.

An article containing the polyimide or poly(imide-amide) copolymer according to an embodiment may be used as a window film for a flexible display device due to excellent optical properties, as well as improved mechanical properties.

Hereafter, this disclosure is described in detail with reference to examples. The following examples and comparative examples are not restrictive, but are illustrative.

EXAMPLES

Synthesis Example 1: Preparation of Poly(amic acid-amide) Copolymer Solution 63 kilograms (kg) of dimethyl acetamide is placed in a reactor, and 907 grams (g) of pyridine is added thereto under a nitrogen atmosphere. Next, 3,671 g of 2,2'-bis(trifluoromethyl)-4,4'-biphenyldiamine (TFDB) is placed in the reactor and dissolved, thereby preparing a TFDB solution. Subsequently, 1,164 g of terephthaloyl chloride (TPCL) is added to the TFDB solution, and the mixture is stirred at 30° C. for 3 hours to obtain an amide oligomer solution. The obtained solution is treated with water to obtain a precipitate, and the precipitate is dried at 80° C. for 48 hours to obtain amide oligomer powder. 4,500 g of the amide oligomer powder, 1,375 g of 4,4'-hexafluoroisopropylidene diphthalic anhydride (6FDA), and 775 g of 3,3',4,4'-biphenyltetracarboxylic dianhydride (BPDA) are added to 37.6 kg of dimethyl acetamide, and the mixture is allowed to react at 30° C. for 48 hours to obtain a poly(amic acid -amide) copolymer solution.

Synthesis Example 2: Preparation of Polyamic Acid Solution 63 kilograms (kg) of dimethyl acetamide is placed in a reactor under a nitrogen atmosphere. Next, 3,671 g of 2,2'-bis(trifluoromethyl)-4,4'-biphenyldiamine (TFDB) is placed in the reactor and dissolved, thereby preparing a TFDB solution. Subsequently, 3990.48 g of 4,4'-hexafluoroisopropylidene diphthalic anhydride (6FDA) and 294.22 g of 3,3',4,4'-biphenyltetracarboxylic dianhydride (BPDA) are added to and dissolved in 37.6 kg of dimethyl acetamide, and this solution is added to the TFDB solution. Then, the mixture is allowed to react at 30° C. for 48 hours to obtain a polyamic acid solution.

Synthesis Example 3: Preparation of Polyamic Acid Solution 63 kilograms (kg) of dimethyl acetamide is placed in a reactor under a nitrogen atmosphere. Next, 3,671 g of 2,2'-bis(trifluoromethyl)-4,4'-biphenyldiamine (TFDB) is placed and dissolved in the reactor, thereby preparing a TFDB solution. Subsequently, 4988.1 g of 4,4'-hexafluoroisopropylidene diphthalic anhydride (6FDA) is added to and dissolved in 37.6 kg of dimethyl acetamide, and this solution is added to the TFDB solution. Then, the mixture is allowed to react at 30° C. for 48 hours to obtain a polyamic acid solution.

Examples and Comparative Examples: Preparation of Poly(imide-amide) Copolymer or Polyimide Film Poly(imide-amide) copolymer or polyimide films are fabricated from the poly(amic acid-amide) copolymer or polyamic acid solutions prepared in Synthesis Examples 1 to 3. That is, as an amide coupling agent, N,N'-dicyclohexyl dicarbonate (DCC) or N,N'-diisopropyl dicarbonate (DIC) is added to the poly(amic acid-amide) copolymer and polyamic acid solutions prepared in Synthesis Examples 1 to 3 to prepare an poly(amic acid-amide) copolymer and polyamic acids having a cross-linking through an amide bond between polymer chains. Then, a chemical imidizing agent is added thereto to prepare a poly(imide-amide) copolymer and polyimide having a crosslinking through an amide bond. Finally, each of the prepared poly(imide-amide) copolymer and polyimide solutions are casted on a supporter to prepare a poly(imide-amide) copolymer or polyimide film according to the Examples and Comparative Examples.

Particularly, an amide coupling agent, DCC, is added to the poly(amic acid-amide) copolymer solution prepared in Synthesis Example 1 in an amount of 1 percent by weight (wt %), 2 wt %, and 4 wt %, respectively, based on the weight of the finally prepared poly(imide-amide) copolymer, and the resulting mixture is allowed to react for 24 hours at 25° C. to prepare a poly(amic acid -amide) copolymer having a crosslinking through an amide bond between the polymer chains. Then, acetic anhydride, followed by pyridine, as chemical imidizing agents, are added thereto, and the mixture is stirred to prepare a poly(imide-amide) copolymer having a crosslinking through an amide bond between the polymer chains. By casting the solution contacting the poly(imide -amide) copolymer on a supporter, and drying the casted film, poly(imide-amide) copolymer films according to Examples 1-1 to 1-3 have been prepared.

Further, an amide coupling agent, DIC, instead of DCC, is added to the poly(amic acid-amide) copolymer solution prepared in Synthesis Example 1 in an amount of 1 wt %, 2 wt %, and 4 wt %, respectively, based on weight of the finally prepared poly(imide-amide) copolymer, and the resulting mixture was allowed to react for 24 hours at 25° C. to prepare a poly(amic acid-amide) copolymer having a crosslinking through an amide bond between the polymer chains. Then, acetic anhydride, followed by pyridine, as chemical imidizing agents, are added thereto, and the mixture is stirred to prepare a poly(imide -amide) copolymer having a crosslinking through an amide bond between the polymer chains. By casting the solution contacting the poly(imide-amide) copolymer on a supporter, and drying the casted film, polyimide-amide) copolymer films according to Examples 1-4 to 1-6 have been prepared.

In addition, a film according to Comparative Example 1 has been prepared by casting a poly(imide-amid) copolymer solution, which is prepared by imidizing the poly(amic acid-amide) copolymer solution prepared in Synthesis Example 1 without adding an amide coupling agent thereto.

Next, an amide coupling agent, DCC, is added to the polyamic acid solution prepared in Synthesis Example 2 in an amount of 1 wt %, 2 wt %, and 4 wt %, respectively, based on weight of the finally prepared polyimide, and the resulting mixture is allowed to react for 24 hours at 25° C. to prepare a polyimide having a crosslinking through an amide bond between the polymer chains. Then, acetic anhydride, followed by pyridine, as a chemical imidizing agent, is added thereto, and the mixture is stirred for preparing a polyimide having a crosslinking through an amide bond between the polymer chains. By casting the solution contacting the polyimide on a supporter, and drying the casted film, polyimide films according to Examples 2-1 to 2-3 have been prepared.

In addition, a film according to Comparative Example 2 has been prepared by casting a polyimide solution, which is prepared by imidizing the polyamic acid solution prepared in Synthesis Example 2 without adding an amide coupling agent thereto.

Then, an amide coupling agent, DIC, is added to the polyamic acid solution prepared in Synthesis Example 3 in an amount of 1 wt %, 2 wt %, and 4 wt %, respectively, based on weight of the finally prepared polyimide, and the resulting mixture was allowed to react for 24 hours at 25° C. to prepare a polyimide having a crosslinking through an amide bond between the polymer chains. Then, acetic anhydride, followed by pyridine, as a chemical imidizing agent, is added thereto, and the mixture is stirred to prepare a polyimide having a crosslinking through an amide bond between the polymer chains. By casting the solution contacting the polyimide on a supporter, and drying the casted film, polyimide films according to Examples 3-1 to 3-3 have been prepared.

In addition, a film according to Comparative Example 3 has been prepared by casting a polyimide solution, which is prepared by imidizing the polyamic acid solution prepared in Synthesis Example 3 without adding an amide coupling agent thereto.

Finally, an amide coupling agent, CDI (carbodiimidazole), is added to the poly(amic acid-amide) copolymer solution prepared in Synthesis Example 1 in an amount of 1 wt %, 2 wt %, 4 wt %, 7 wt %, and 10 wt %, respectively, based on weight of the finally prepared poly(imide-amide) copolymer, and the resulting mixture was allowed to react for 24 hours at 25° C. to prepare a poly(amic acid -amide) copolymer having a crosslinking through an amide bond between the polymer chains. Then, acetic anhydride, followed by pyridine, as chemical imidizing agents, are added thereto, and the mixture is stirred to prepare a poly(imide-amide) copolymer having a crosslinking through an amide bond between the polymer chains. By casting the solution contacting the poly(imide -amide) copolymer on a supporter, and drying the casted film, poly(imide-amide) copolymer films according to Examples 4-1 to 4-5 have been prepared.

In addition, a film according to Comparative Example 4 has been prepared by casting a poly(imide-amid) copolymer solution, which is prepared by imidizing the poly(amic acid-amide) copolymer solution prepared in Synthesis Example 1 without adding an amide coupling agent thereto, but which has different thickness from the film according to Comparative Example 1.

Evaluation of Optical and Mechanical Properties of Film

Amount of DCC, DIC, or CDI, the amide coupling agent in the films according to the Example and Comparative Examples, film thickness, light transmittance (Tr), Yellowness Index (YI), haze, tensile modulus, and tensile stress at break of the films are measured and described in Table 1 below. Further, FT-IR graphs of the films according to Comparative Example 2 and Examples 2-1 to 2-3 are shown in FIG. 1, and FT-IR graphs of the films according to Comparative Example 3 and Examples 3-1 to 3-3 are shown in FIG. 2.

Methods for measuring the film thickness, light transmittance, YI, haze, tensile modulus, and tensile stress at break are indicated below.

(1) Film Thickness

Film thickness is measured by calculating an average of the values determined for 5 points at the center and every 4 corners of the sample film having a size of 4 cm×4 cm (cm=centimeter), by using Mitutoyo thickness measuring instrument.

(2) YI, Light Transmittance, and Haze

Yellowness index (YI), light transmittance (at a wavelength range of 350 nm to 760 nm), and haze are measured for a film having a thickness of about 50 micrometers, according to an ASTM D1925 method by using a spectrophotometer, CM-3600d made by Konica Minolta Inc.

(3) Tensile Modulus and Tensile Stress at Break

Tensile modulus is measured by using Universal Tensile Machine of Instron Com., Ltd. A sample for measuring a tensile modulus has a width of 1 cm, and a distance between the grips of 10 cm. The cross head speed is 24 millimeter/minute.

TABLE 1

|  | Amount of amide coupling agent and film thickness | Transmittance (Tr) (%) | YI | Haze | Modulus Average (GPa) | Tensile Stress Average (MPa) |
| --- | --- | --- | --- | --- | --- | --- |
| Comparative Example 1 | Ref_43 μm | 88.5 | 2.4 | 0.5 | 6.8 | 167.1 |
| Example 1-1 | DCC_1 wt %_42 μm | 88.5 | 2.8 | 0.7 | 7.0 | 165.4 |
| Example 1-2 | DCC_2 wt %_40 μm | 88.5 | 3.0 | 0.6 | 7.2 | 168.1 |
| Example 1-3 | DCC_4 wt %_42 μm | 88.3 | 3.8 | 0.8 | 7.3 | 174.2 |
| Example 1-4 | DCC_1 wt %_41 μm | 88.5 | 2.5 | 0.8 | 7.0 | 171.1 |
| Example 1-5 | DCC_2 wt %_43 μm | 88.6 | 2.6 | 0.7 | 7.3 | 179.7 |
| Example 1-6 | DCC_4 wt %_43 μm | 88.5 | 2.7 | 0.9 | 7.3 | 171.6 |
| Comparative Example 2 | Ref_43 μm | 90.1 | 1.6 | 0.4 | 3.9 | 132.8 |
| Example 2-1 | DCC_1 wt %_42 μm | 90.0 | 2.8 | 0.3 | 4.1 | 138.5 |
| Example 2-2 | DCC_2 wt %_44 μm | 89.7 | 3.6 | 0.3 | 4.3 | 141.1 |
| Example 2-3 | DCC_4 wt %_45 μm | 89.3 | 4.4 | 0.4 | 4.3 | 144.5 |
| Comparative Example 3 | Ref_45 μm | 90.6 | 1.3 | 0.5 | 3.9 | 130.8 |
| Example 3-1 | DIC_1 wt %_43 μm | 90.6 | 1.6 | 0.3 | 4.0 | 134.9 |
| Example 3-2 | DIC_2 wt %_44 μm | 90.5 | 1.8 | 0.8 | 4.0 | 134.9 |
| Example 3-3 | DIC_4 wt %_45 μm | 90.5 | 2.1 | 0.5 | 4.1 | 135.4 |
| Comparative Example 4 | Ref_41 μm | 90.6 | 1.3 | 0.4 | 7 | 215.3 |
| Example 4-1 | CDI_1 wt %_39 μm | 88.6 | 2.2 | 0.4 | 7.1 | 220.4 |
| Example 4-2 | CDI_2 wt %_39 μm | 88.6 | 2.3 | 0.6 | 7.1 | 219.5 |
| Example 4-3 | CDI_4 wt %_39 μm | 88.6 | 2.3 | 0.7 | 7.3 | 223.8 |
| Example 4-4 | CDI_7 wt %_41 μm | 88.6 | 3.1 | 0.5 | 7.5 | 242.3 |
| Example 4-5 | CDI_10 wt %_40 μm | 88.6 | 3.4 | 0.6 | 7.4 | 237.2 |

As shown in Table 1, the films according to Examples 1-1 to 4-5 prepared by adding DCC, DIC, or CDI, as an amide coupling agent, to the polyamic acid or poly(amic acid-amide) copolymer in an amount of less than or equal to 10 weight %, for example, from 1 weight % to 10 weight %, based on the weight of the finally prepared polyimide or poly(imide-amide) copolymer, have significantly improved mechanical properties, such as, a tensile modulus and tensile stress at break, while maintaining good optical properties, compared with the films according to Comparative Examples 1 to 4, prepared by not adding the amide coupling agent to the polyamic acid or poly(amic acid-amide) copolymer.

Further, as shown from FIG. 1 and FIG. 2, it is understood that the improved mechanical properties of the films according to the Examples may be due to a crosslinking through an amide bond between the polymer chains of the polyimide or poly(imide-amide) copolymer, as the polyimides according to Examples 2 and 3 show increased amide bonds and reduced imide bonds due to the introduction of the amide coupling agent, compared with the polyimide according to Comparative Examples.

While this disclosure has been described in connection with what is presently considered to be practical exemplary embodiments, it is to be understood that the description is not limited to the disclosed embodiments, but, on the contrary, is intended to cover various modifications and equivalent arrangements included within the spirit and scope of the appended claims.

What is claimed is:

1. A composition for preparing at least one of a polyimide and a poly(imide-amide) copolymer, the composition comprising at least one of a polyamic acid or a poly(amic acid-amide) copolymer, and at least one of a carbodiimide derivative or a carbodiimidazole derivative, wherein the polyamic acid comprises a structural unit represented by Chemical Formula 1, and wherein poly(amic acid-amide) copolymer comprises a structural unit represented by Chemical Formula 1 and a structural unit represented by Chemical Formula 3:

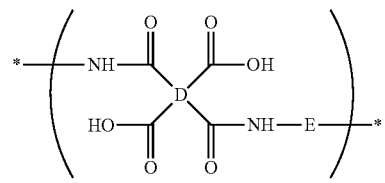

Chemical Formula 1 wherein, in Chemical Formula 1,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, and
* is a linking point to an adjacent atom;

Chemical Formula 3

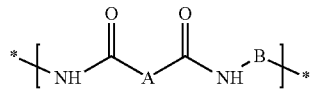

wherein, in Chemical Formula 3,
A is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,
B is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, and
* is a linking point to an adjacent atom.

2. The composition according to claim 1, wherein the carbodiimide derivative comprises N,N'-dicyclohexyl carbodiimide, N,N'-diisopropyl carbodiimide, or a combination thereof, and wherein the cabodiimidazole derivative comprises a carbodiimidazole.

3. The composition according to claim 1, wherein an amount of the at least one of the carbodiimide derivative and a carbodiimidazole derivative is less than or equal to about 20 percent by weight based on the total weight of the at least one of the polyimide and the poly(imide-amide) copolymer.

4. The composition according to claim 1, wherein an amount of the at least one of the carbodiimide derivative and a carbodiimidazole derivative ranges from about 0.1 percent by weight to about 15 percent by weight based on the total weight of the at least one of the polyimide and the poly(imide-amide) copolymer.

5. The composition according to claim 1, wherein D in Chemical Formula 1 is selected from the chemical formulae of Group 1:

Group 1

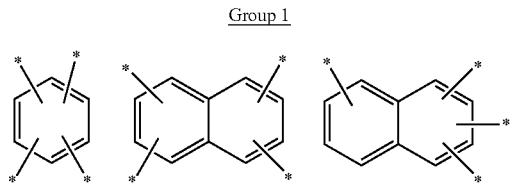

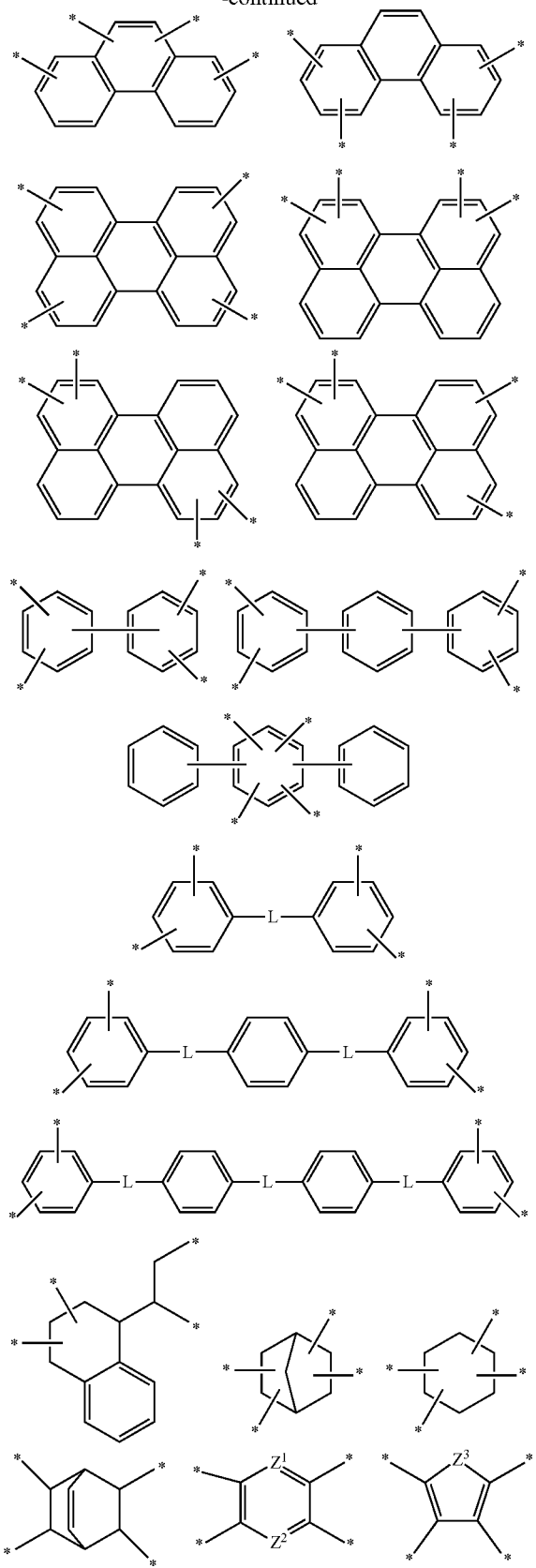

wherein, in the chemical formulae of Group 1, each residual group is substituted or unsubstituted, and each L is the same or different and is independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

6. The composition according to claim 1, wherein D in Chemical Formula 1 is selected from the chemical formulae of Group 2:

Group 2

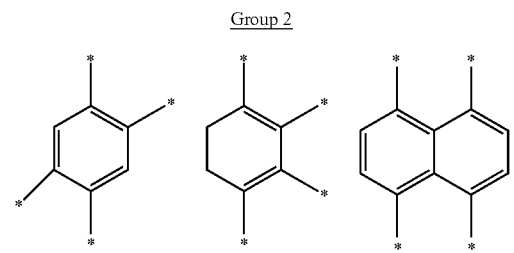

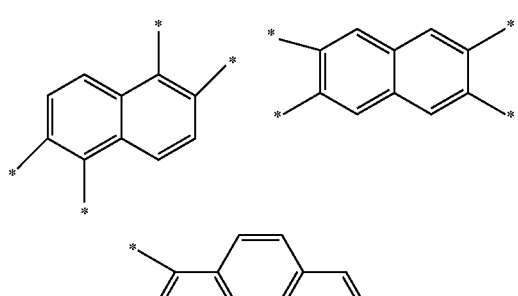

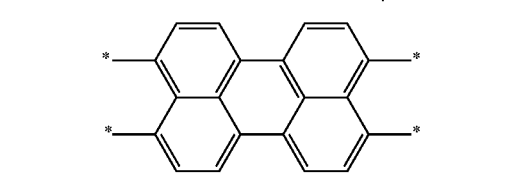

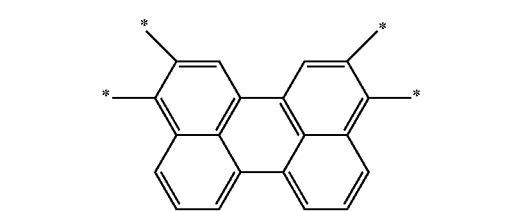

-continued

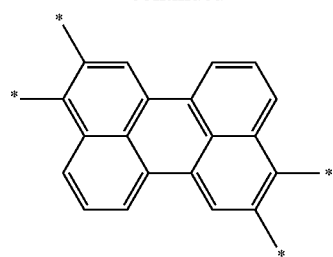

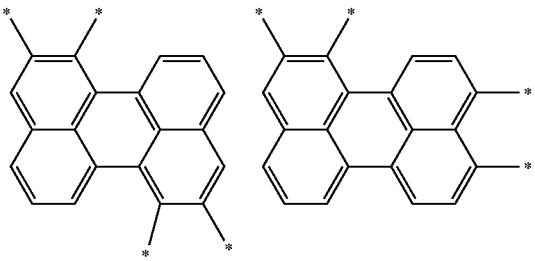

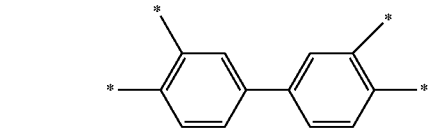

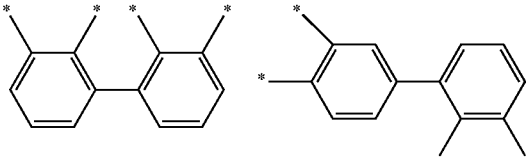

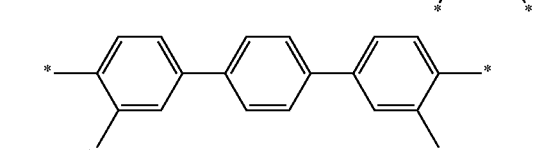

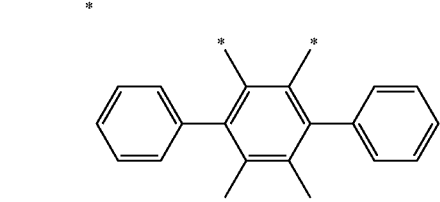

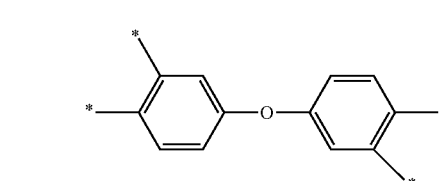

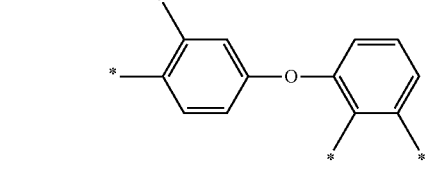

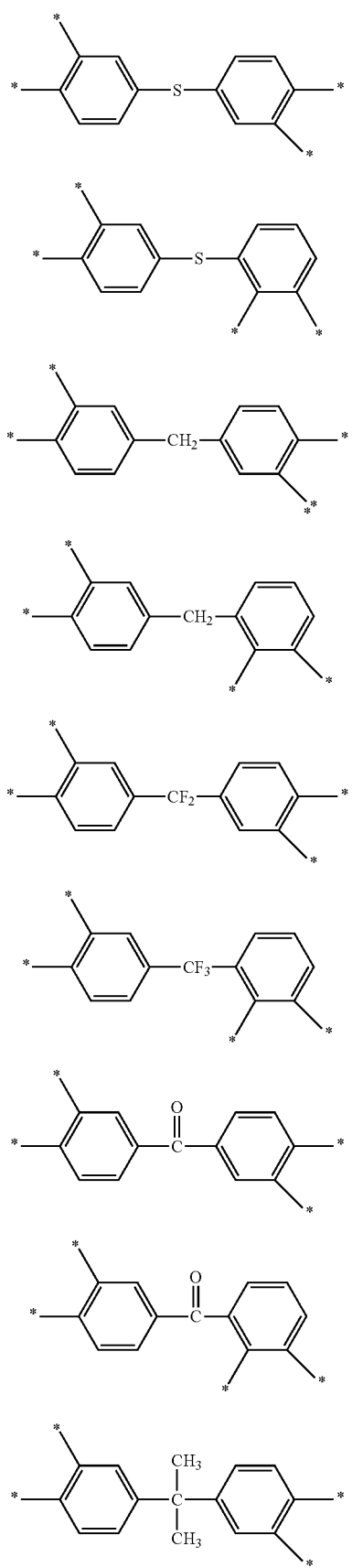
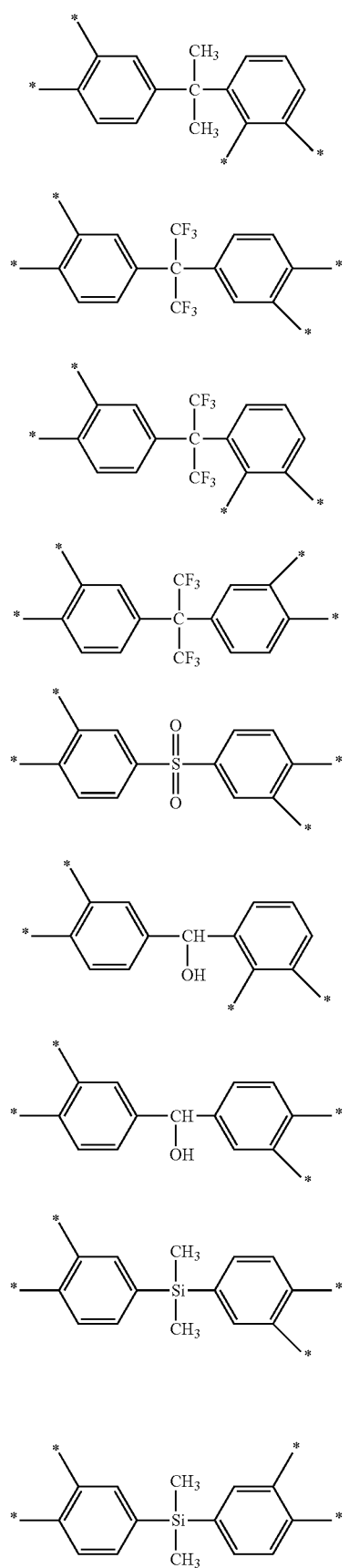

-continued

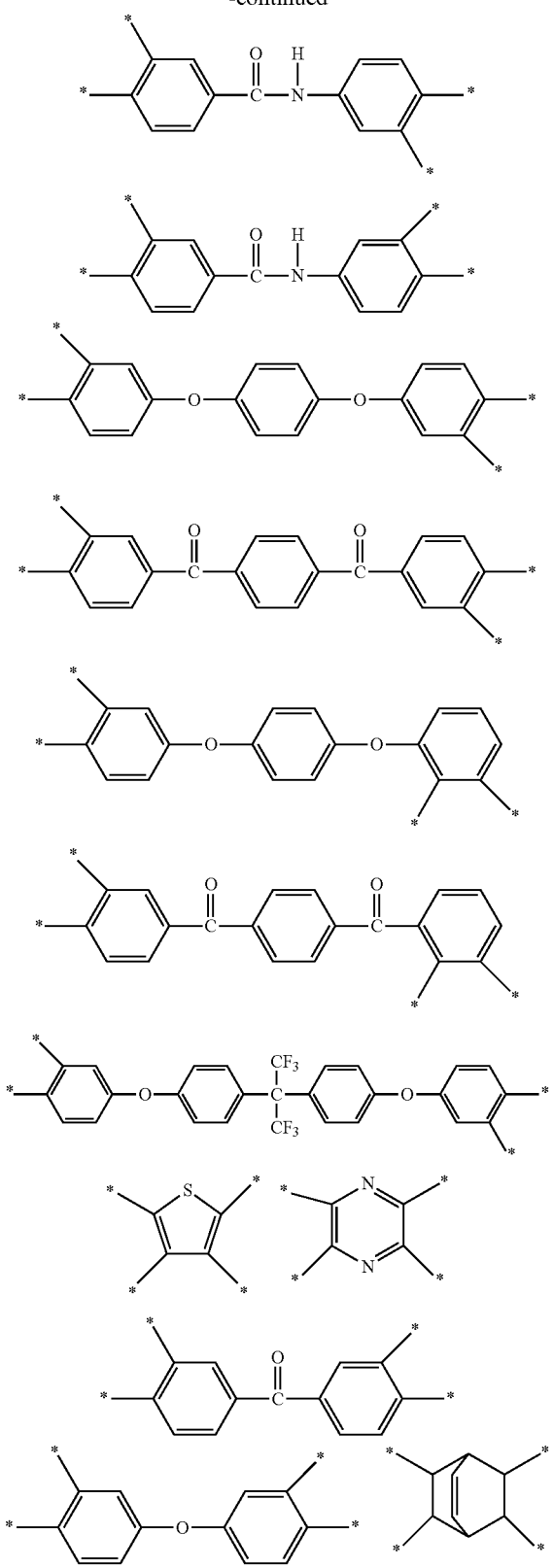

wherein, in the chemical formulae of Group 2,
each residual group is substituted or unsubstituted, and
* is a linking point to an adjacent atom.

7. The composition according to claim 1, wherein E in Chemical Formula 1 and B in Chemical Formula 3 are independently represented by Chemical Formula 5:

Chemical Formula 5

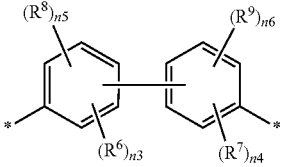

wherein, in Chemical Formula 5,
$R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$,
$R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group,
n3 is an integer ranging from 1 to 4, n5 is an integer ranging from 0 to 3, provided that n3+n5 is an integer of 4 or less,
n4 is an integer ranging from 1 to 4, n6 is an integer ranging from 0 to 3, provided that n4+n6 is an integer of 4 or less, and
* is a linking point to an adjacent atom.

8. The composition according to claim 1, wherein A in Chemical Formula 3 is selected from the chemical formulae of Group 3:

Group 3

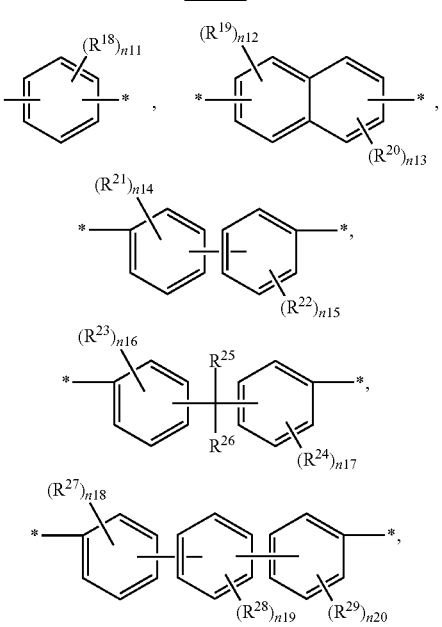

wherein, in the chemical formulae of Group 3,

R[18] to R[29] are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and

* is a linking point to an adjacent atom.

9. The composition according to claim 1, wherein A in Chemical Formula 3 is selected from the chemical formulae of Group 4:

Group 4

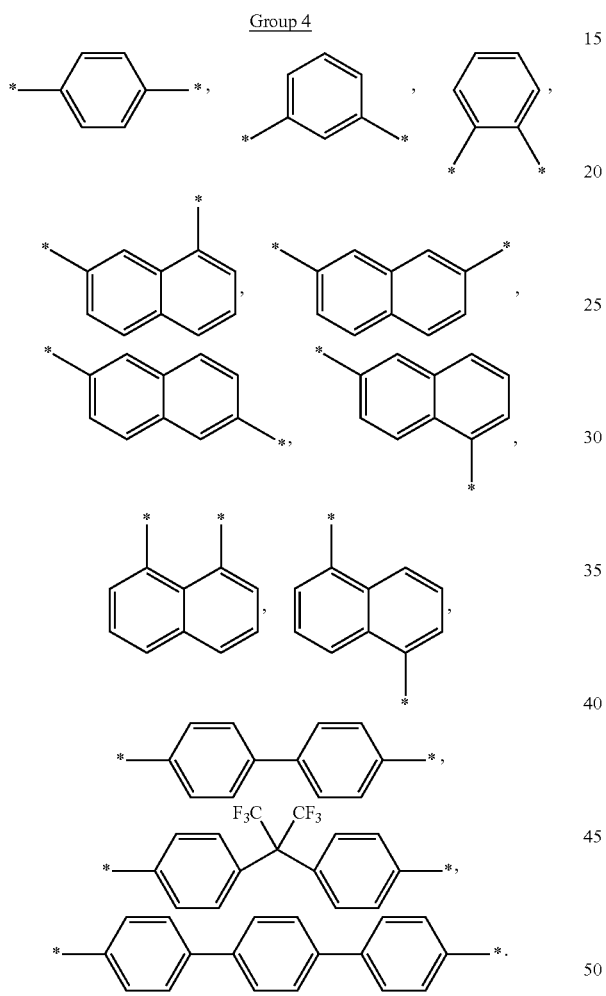

wherein, in the chemical formulae of Group 4,
each residual group is substituted or unsubstituted, and
* is a linking point to an adjacent atom.

10. A polyamic acid or poly(amic acid-amide) copolymer comprising a crosslinking through an amide bond between the polyamic acid and/or the poly(amic acid-amide) copolymer chains, wherein the poly(amic acid-amide) copolymer comprises a structural unit represented by Chemical Formula 1, and the poly(amic acid-amide) copolymer comprises a structural unit represented by Chemical Formula 1 and a structural unit represented by Chemical Formula 3, and wherein the crosslinking through an amide bond between the polyamic acid and/or the poly(amic acid-amide) copolymer chain is formed by a carboxylic acid group included in the structural unit represented by Chemical Formula 1, which is included in the polyamic acid and the poly(amic acid-amide) copolymer, and a terminal amino group present at least one end of the polyamic acid and/or the poly(amic acid-amide) copolymer.

Chemical Formula 1

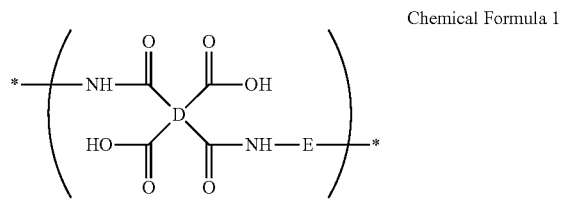

wherein, in Chemical Formula 1,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, and

* is a linking point to an adjacent atom;

Chemical Formula 3

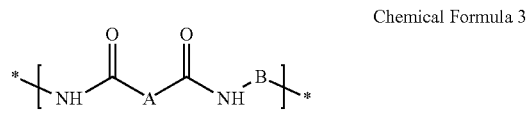

wherein, in Chemical Formula 3,

A is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, B is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, and

* is a linking point to an adjacent atom.

11. The polyamic acid or poly(amic acid-amide) copolymer according to claim 10, which is represented by Chemical Formula 6:

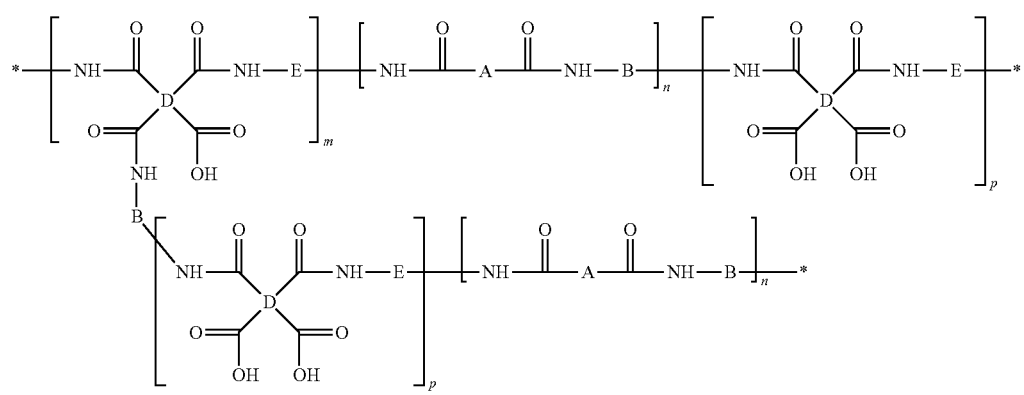

Chemical Formula 6 wherein, in Chemical Formula 6,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring and the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, A is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, B is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, m and p are independently an integer ranging from 1, n is an integer ranging from 0, and

* is a linking point to an adjacent atom.

12. The polyamic acid or poly(amic acid-amide) copolymer according to claim 11, wherein D is selected from Group 1, E and B are independently selected from Chemical Formula 5, and A is selected from Group 3:

Group 1

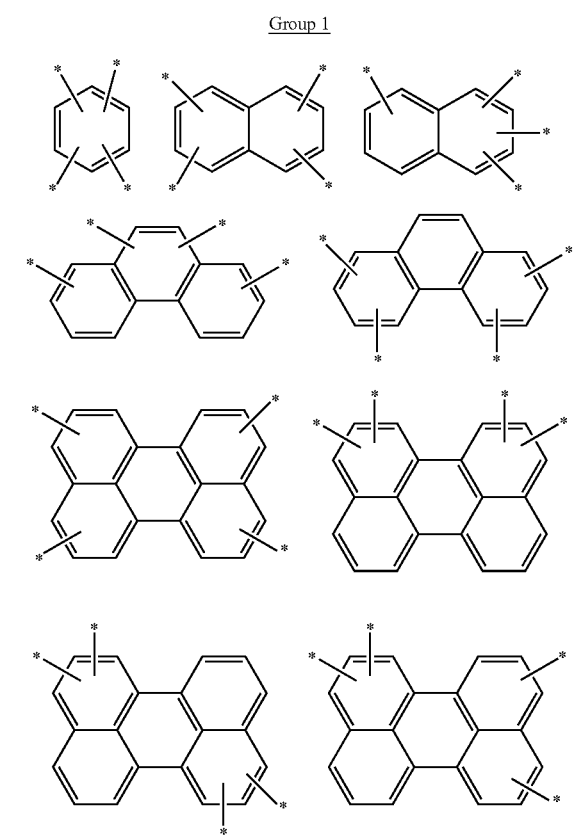

-continued

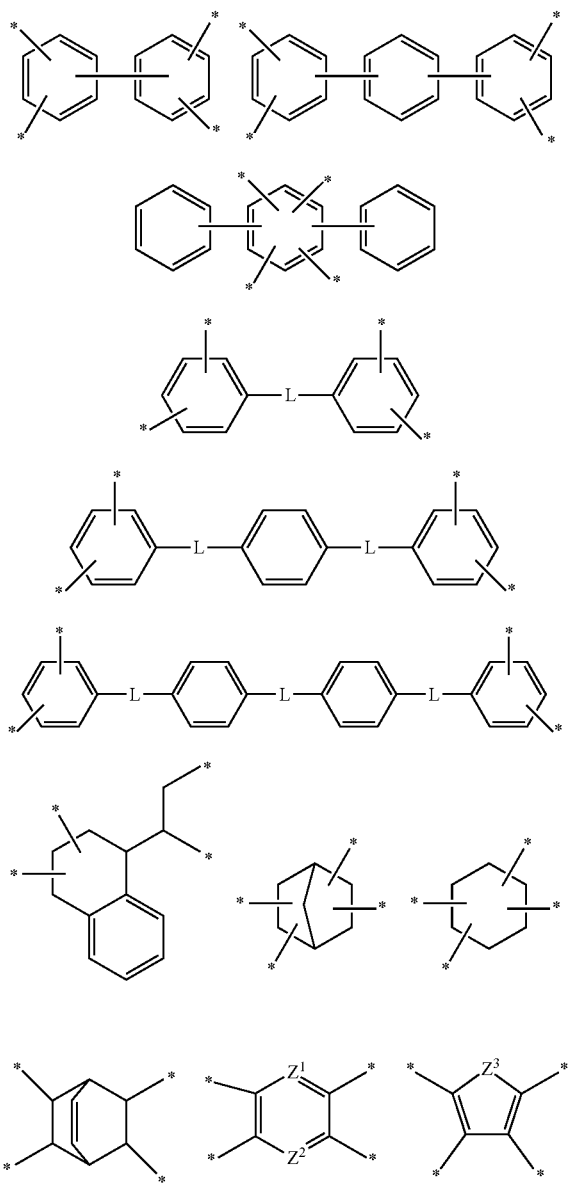

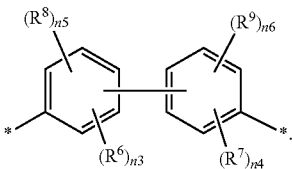

Chemical Formula 5 wherein, in Chemical Formula 5,
$R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$,
$R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group,
n3 is an integer ranging from 1 to 4, n5 is an integer ranging from 0 to 3, provided that n3+n5 is an integer of 4 or less,
n4 is an integer ranging from 1 to 4, n6 is an integer ranging from 0 to 3, provided that n4+n6 is an integer of 4 or less, and
* is a linking point to an adjacent atom;

Group 3

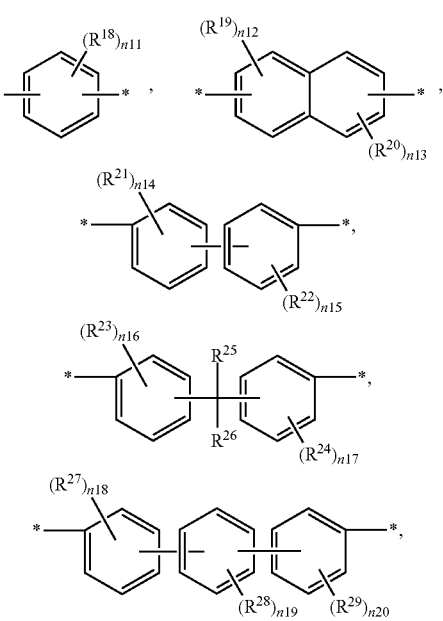

wherein, in the chemical formulae of Group 3,
$R^{18}$ to $R^{29}$ are the same or different and are independently deuterium, a halogen, a substituted or unsubstituted C1 to C10 aliphatic organic group, or a substituted or unsubstituted C6 to C20 aromatic organic group,
n11 and n14 to n20 are independently an integer ranging from 0 to 4,
n12 and n13 are independently an integer ranging from 0 to 3, and
* is a linking point to an adjacent atom.

wherein, in the chemical formulae of Group 1,
each residual group is substituted or unsubstituted, and each L is the same or different and is independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,
* is a linking point to an adjacent atom,
$Z^1$ and $Z^2$ are the same or different and are independently —N= or —C(R$^{100}$)=, wherein R$^{100}$ is hydrogen or a C1 to C5 alkyl group, provided that $Z^1$ and $Z^2$ are not simultaneously —C(R$^{100}$)=, and
$Z^3$ is —O—, —S—, or —NR$^{101}$—, wherein R$^{101}$ is hydrogen or a C1 to C5 alkyl group;

13. A polyimide or poly(imide-amide) copolymer comprising a crosslinking through an amide bond between the polyimide or poly(imide-amide) copolymer chains prepared from the polyamic acid or poly(amic acid-amide) copolymer according to claim 10.

14. The polyimide or poly(imide-amide) copolymer according to claim 13, which is represented by Chemical Formula 7:

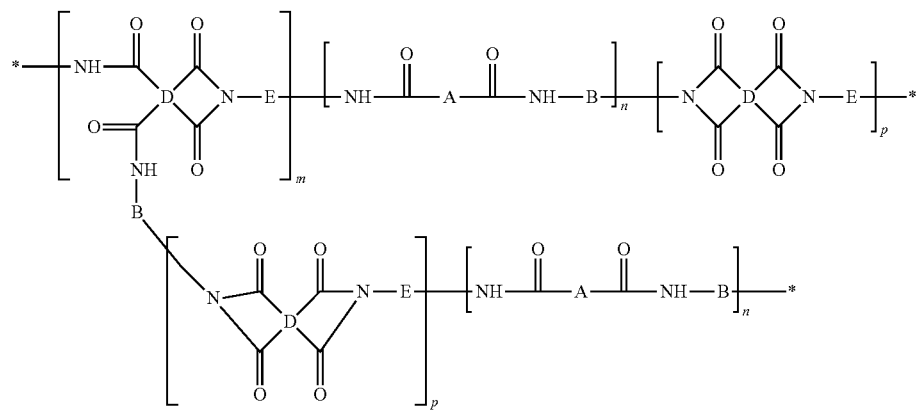

Chemical Formula 7 wherein, in Chemical Formula 7,

D is a substituted or unsubstituted tetravalent C6 to C24 aliphatic cyclic group, a substituted or unsubstituted tetravalent C6 to C24 aromatic ring group, or a substituted or unsubstituted tetravalent C4 to C24 hetero aromatic ring group, wherein the aliphatic cyclic group, the aromatic ring group, or the hetero aromatic ring group is present as a single ring, as a condensed ring system comprising two or more fused rings, or as a system comprising two or more moieties selected from the single ring or the condensed ring system linked by a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, E is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, A is a substituted or unsubstituted divalent C6 to C24 aromatic ring group, wherein the aromatic ring group is prsent as a single ring, as a condensed ring system comprising two or more fused rings, or as a system comprising two or more moieties selected from the single ring or the condensed ring system linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—, B is a substituted or unsubstituted divalent C6 to C24 aromatic ring group, wherein the aromatic ring group is present as a single ring, as a condensed ring system comprising two or more fused rings, or as a system comprising two or more moieties selected from the single ring or the condensed ring system linked by a single bond or a fluorenylene group, m and p are independently an integer ranging from 1,
n is an integer ranging from 0, and
* is a linking point to an adjacent atom.

15. The polyimide or poly(imde-amide) copolymer according to claim 14, wherein D is selected from Group 1, E and B are independently selected from Chemical Formula 5, and A is selected from Group 3:

Group 1

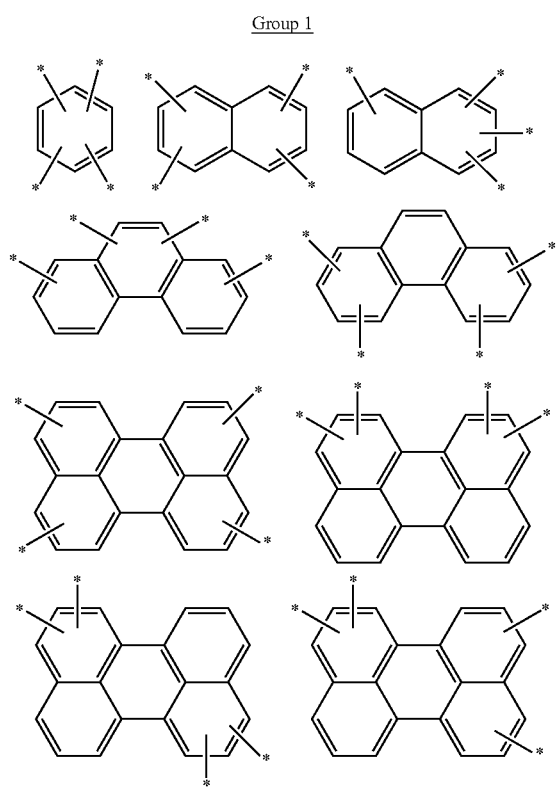

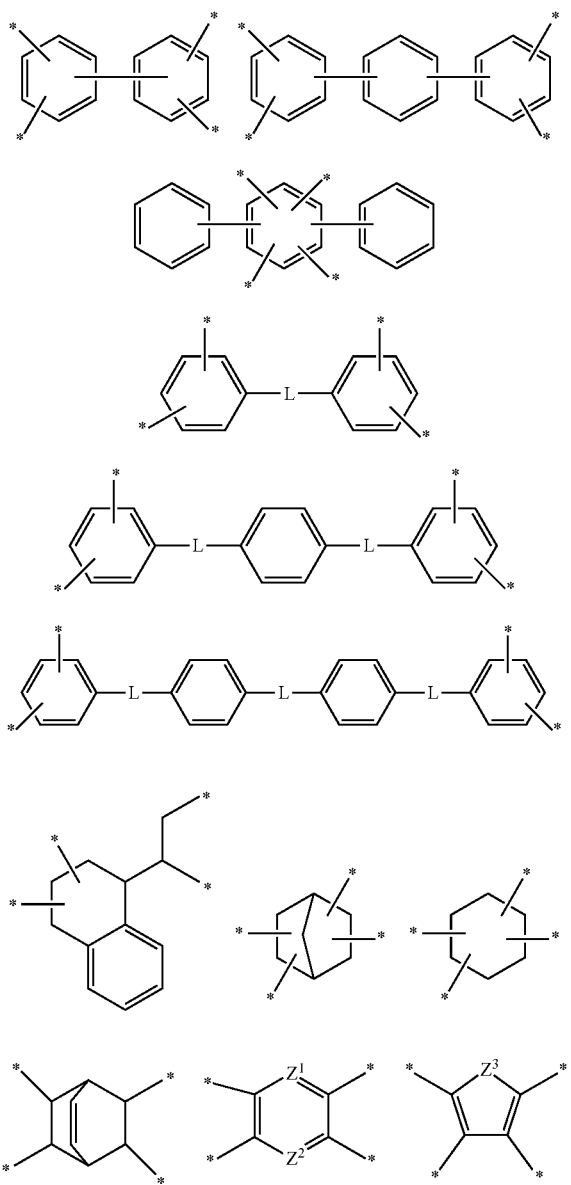

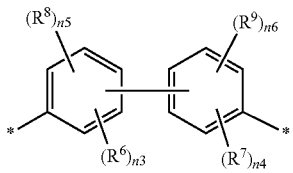

Chemical Formula 5 wherein, in Chemical Formula 5, $R^6$ and $R^7$ are the same or different and are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom;

wherein, in the chemical formulae of Group 1, each residual group is substituted or unsubstituted, and each L is the same or different and is independently a single bond, —O—, —S—, —C(=O)—, —CH(OH)—, —S(=O)$_2$—, —Si(CH$_3$)$_2$—, —(CH$_2$)$_p$— (wherein, 1≤p≤10), (CF$_2$)$_q$ (wherein, 1≤q≤10), —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein, 1≤n≤10, 1≤p≤10, and 1≤q≤10), —C(CF$_3$)(C$_6$H$_5$)—, or —C(=O)NH—,

* is a linking point to an adjacent atom, $Z^1$ and $Z^2$ are the same or different and are independently —N= or —C($R^{100}$)=, wherein $R^{100}$ is hydrogen or a C1 to C5 alkyl group, provided that $Z^1$ and $Z^2$ are not simultaneously —C($R^{100}$)=, and $Z^3$ is —O—, —S—, or —$NR^{101}$—, wherein $R^{101}$ is hydrogen or a C1 to C5 alkyl group;

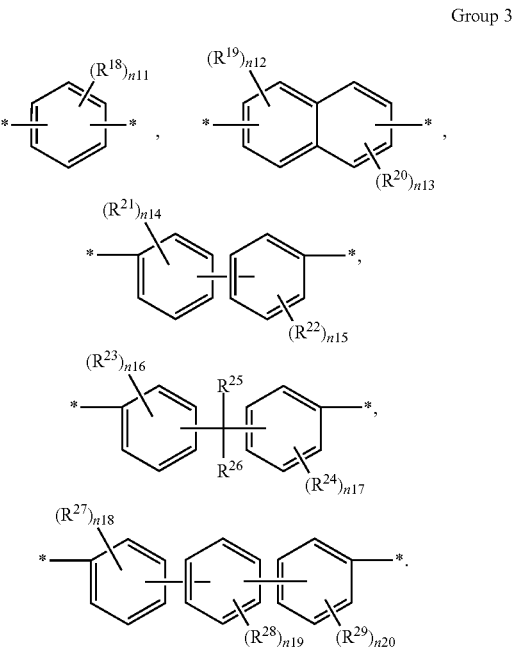

Group 3 wherein, in the chemical formulae of Group 3, $R^{18}$ to $R^{29}$ are the same or different and are independently deuterium, a halogen, a substituted or unsubstituted C1 to C10 aliphatic organic group, or a substituted or unsubstituted C6 to C20 aromatic organic group, n11 and n14 to n20 are independently an integer ranging from 0 to 4, n12 and n13 are independently an integer ranging from 0 to 3, and
* is a linking point to an adjacent atom.
16. The polyimide or poly(imide-amide) copolymer according to claim 14, wherein D is selected from Group 2, E and B are independently selected from Chemical Formula 5, and A is selected from Group 4:
Group 2
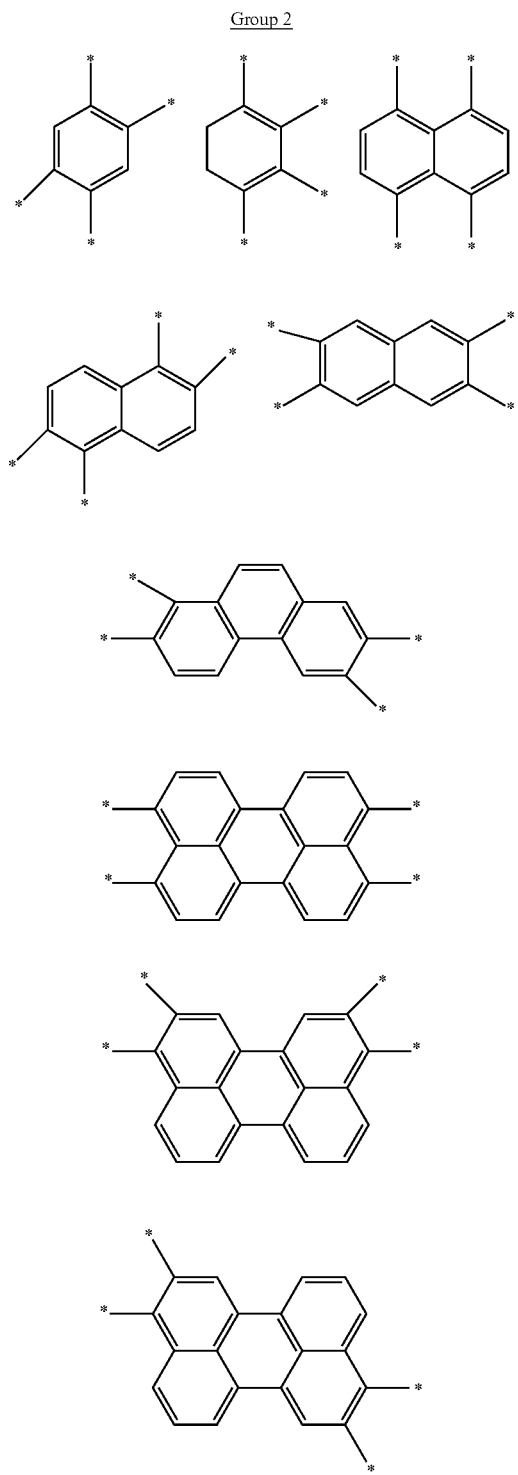
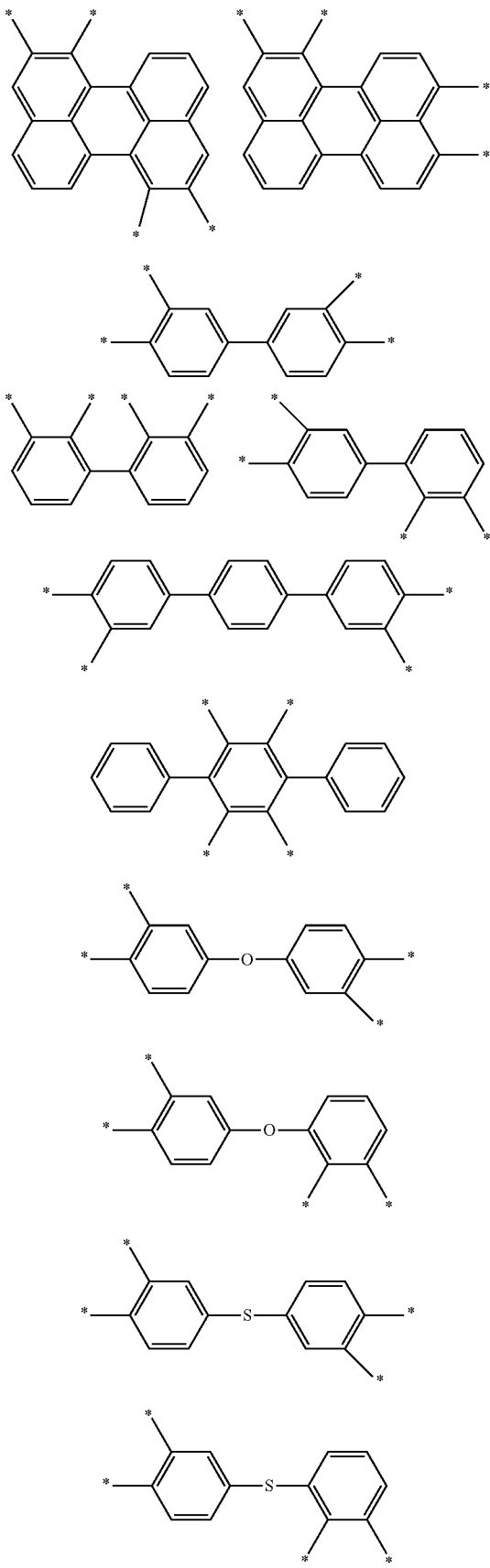

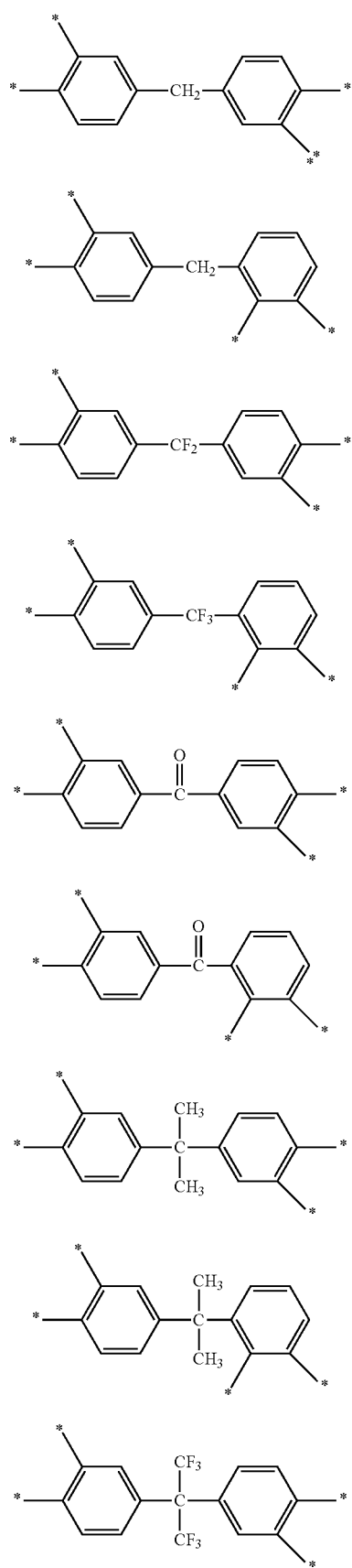
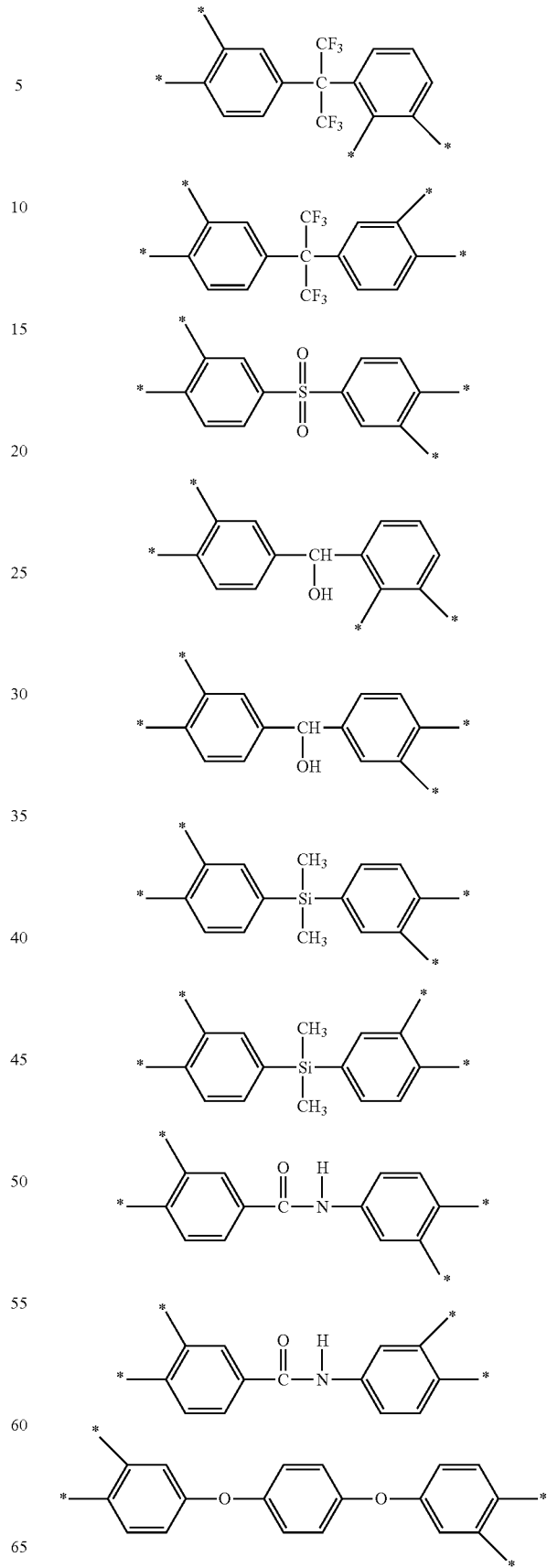

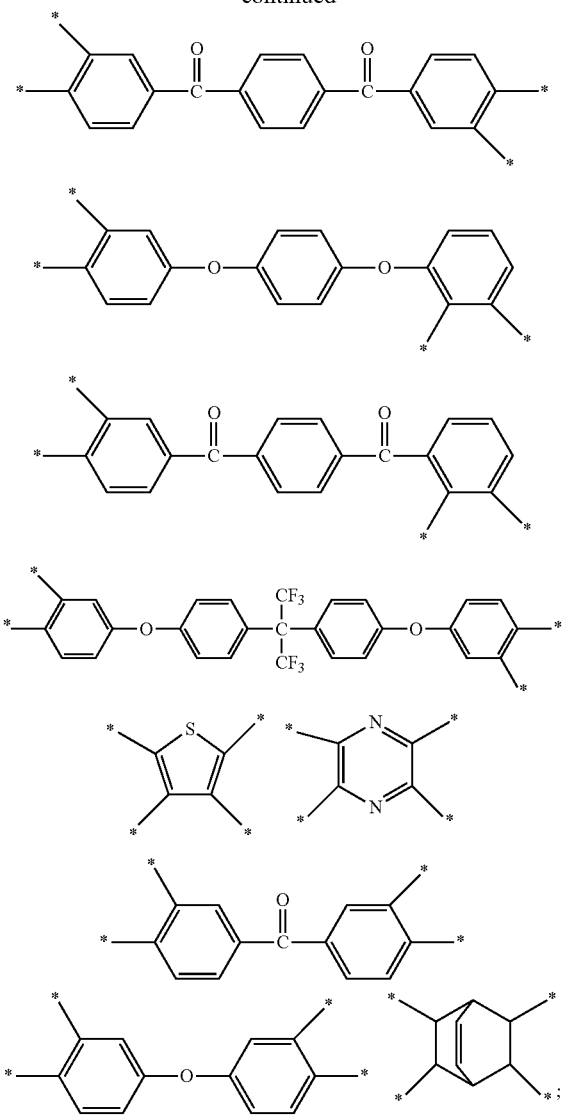

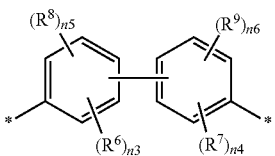

wherein, in Chemical Formula 5,

R⁶ and R⁷ are the same or different and are independently an electron withdrawing group selected from —CF₃, —CCl₃, —CBr₃, —Cl₃, —F, —Cl, —Br, —I, —NO₂, —CN, —COCH₃, and —CO₂C₂H₅, R⁸ and R⁹ are the same or different and are independently a halogen, a hydroxy group, an alkoxy group (—OR²⁰⁴, wherein R²⁰⁴ is a C1 to C10 aliphatic organic group), a silyl group (—SiR²⁰⁵R²⁰⁶R²⁰⁷, wherein R²⁰⁵, R²⁰⁶ and R²⁰⁷ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and \* is a linking point to an adjacent atom;

Group 4

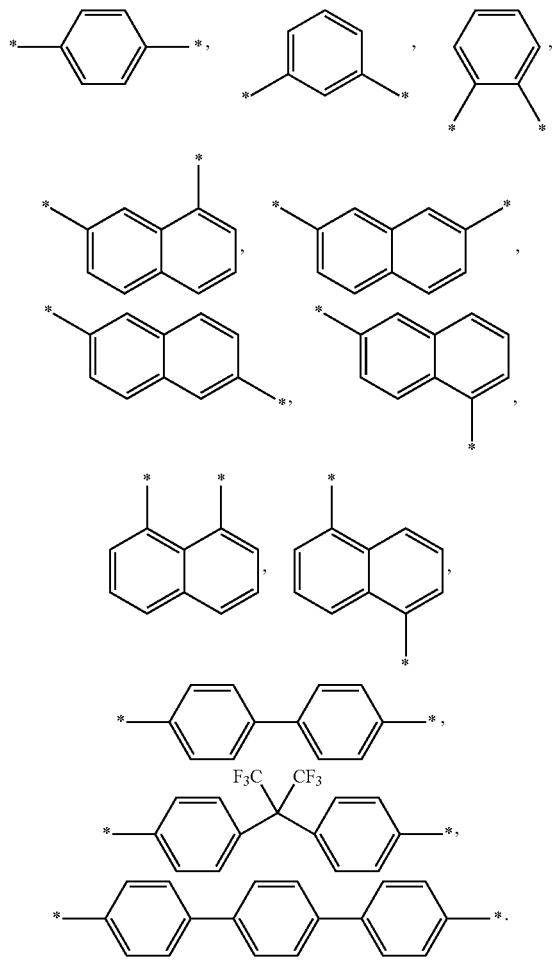

wherein, in the chemical formulae of Groups 2 and 4, each residual group is substituted or unsubstituted, and \* is a linking point to an adjacent atom.

17. An article comprising the polyimide or poly(imide-amide) copolymer according to claim 13.

18. A display device comprising the article according to claim 17.

19. The polyimide or the poly(amic acid-amide) copolymer according to claim 10, wherein E in Chemical Formula 1 and B in Chemical Formula 3 are independently represented by Chemical Formula 5:

Chemical Formula 5

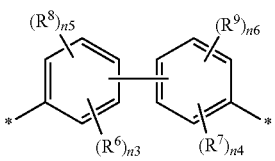

wherein, in Chemical Formula 5, $R^6$ and $R^7$ are the same or different and are independently an electron withdrawing group selected from —$CF_3$, —$CCl_3$, —$CBr_3$, —$CI_3$, —F, —Cl, —Br, —I, —$NO_2$, —CN, —$COCH_3$, and —$CO_2C_2H_5$, $R^8$ and $R^9$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, provided that n3+n5 is an integer of 4 or less, n4 is an integer ranging from 1 to 4, n6 is an integer ranging from 0 to 3, provided that n4+n6 is an integer of 4 or less, and

* is a linking point to an adjacent atom.

20. The polyimide or poly(amic acid-amide) copolymer according to claim 19, wherein the polyimide or the poly(amic acid-amide) copolymer crosslinked through an amide bond between the polyimide or the poly(amic acid-amide) copolymer chains has a greater tensile modulus and greater tensile stress at break than a corresponding comparative polyimide or a poly(amic acid-amide) copolymer that is not crosslinked through an amide bond between polyimide chains or poly(amic acid-amide copolymer chains.

* * * * *